United States Patent
Park et al.

(10) Patent No.: US 11,849,250 B2
(45) Date of Patent: *Dec. 19, 2023

(54) SIGNAL PROCESSING DEVICE AND VIDEO DISPLAY DEVICE COMPRISING SAME

(71) Applicant: LG ELECTRONICS INC., Seoul (KR)

(72) Inventors: Saem Park, Seoul (KR); Seokpan Kang, Seoul (KR); Yongtaek Gong, Seoul (KR); Sangchurl Nam, Seoul (KR); Yeonoh Nam, Seoul (KR); Jeonghyu Yang, Seoul (KR); Kyungmee Lee, Seoul (KR); Myongyoung Lee, Seoul (KR); Seoksoo Lee, Seoul (KR); Wonwoo Lee, Seoul (KR); Seungjong Choi, Seoul (KR); Jongwoo Ha, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 17/938,107

(22) Filed: Oct. 5, 2022

(65) Prior Publication Data

US 2023/0044956 A1 Feb. 9, 2023

Related U.S. Application Data

(63) Continuation of application No. 17/287,731, filed as application No. PCT/KR2019/013942 on Oct. 23, 2019, now Pat. No. 11,616,930.

(30) Foreign Application Priority Data

Oct. 23, 2018 (KR) .......................... 10-2018-0126634

(51) Int. Cl.
*H04N 7/01* (2006.01)
*G06N 3/08* (2023.01)
(Continued)

(52) U.S. Cl.
CPC ............. *H04N 7/0132* (2013.01); *G06N 3/08* (2013.01); *G06T 7/0002* (2013.01);
(Continued)

(58) Field of Classification Search
CPC .. H04N 7/0132; H04N 7/0117; H04N 21/647; G06N 3/08; G06T 7/0002; G06T 2207/10016; G06T 2207/30168
(Continued)

(56) References Cited

U.S. PATENT DOCUMENTS 6,567,117 B1 5/2003 Nago et al.
8,045,817 B2 * 10/2011 Jun .................... H04N 7/012
382/254

(Continued)

FOREIGN PATENT DOCUMENTS

JP 2012-019380 1/2012
KR 10-2007-0093995 9/2007
(Continued)

OTHER PUBLICATIONS

PCT International Application No. PCT/KR2019/013942, International Search Report dated Feb. 19, 2020, 3 pages.
(Continued)

*Primary Examiner* — Trang U Tran
(74) *Attorney, Agent, or Firm* — LEE, HONG, DEGERMAN, KANG & WAIMEY PC

(57) ABSTRACT

Disclosed are a signal processing device and an image display apparatus including the same. The signal processing device of an embodiment of the present disclosure includes: a quality calculator configured to calculate a source quality
(Continued)

of an image signal received from an external settop box or a network; an image quality setter configured to set an image quality of the image signal based on the calculated source quality; and an image quality processor configured to perform image quality processing on the image signal based on the set image quality, wherein in response to the source quality of the received image signal being changed at a first time point, the image quality setter changes an image quality setting sequentially from a first setting to a second setting; and based on the image quality setting, the image quality processor performs image quality processing. Accordingly, flicker may be reduced when an image quality is changed due to a change in the source quality of the received image signal.

20 Claims, 24 Drawing Sheets

(51) Int. Cl.
  *G06T 7/00* (2017.01)
  *H04N 21/647* (2011.01)
(52) U.S. Cl.
  CPC ......... *H04N 7/0117* (2013.01); *H04N 21/647* (2013.01); *G06T 2207/10016* (2013.01); *G06T 2207/30168* (2013.01)
(58) Field of Classification Search
  USPC ....................................................... 348/447
  See application file for complete search history.

(56) References Cited

U.S. PATENT DOCUMENTS

| | | | | |
|---|---|---|---|---|
| 9,560,363 | B2* | 1/2017 | Nakano | H04N 7/181 |
| 10,460,231 | B2* | 10/2019 | Zhang | G06V 20/00 |
| 10,834,406 | B2* | 11/2020 | Li | H04N 21/23418 |
| 11,258,927 | B2 | 2/2022 | Tanigawa | |
| 2006/0221260 | A1 | 10/2006 | Fujine et al. | |
| 2012/0057078 | A1 | 3/2012 | Fincham | |
| 2015/0042881 | A1 | 2/2015 | Fincham | |
| 2015/0178895 | A1 | 6/2015 | Owaki et al. | |
| 2016/0343113 | A1 | 11/2016 | Choudhury et al. | |
| 2018/0122048 | A1 | 5/2018 | Wang et al. | |
| 2018/0144214 | A1 | 5/2018 | Hsieh et al. | |
| 2018/0365799 | A1 | 12/2018 | Yokomizo | |
| 2021/0400231 | A1 | 12/2021 | Park et al. | |

FOREIGN PATENT DOCUMENTS

| | | |
|---|---|---|
| KR | 10-2009-0011515 | 2/2009 |
| KR | 10-2014-0145801 | 12/2014 |
| KR | 10-2017-0078516 | 7/2017 |

OTHER PUBLICATIONS

U.S. Appl. No. 17/287,731, Office Action dated Apr. 27, 2022, 11 pages.
U.S. Appl. No. 17/287,731, Notice of Allowance dated Jul. 15, 2022, 5 pages.
European Patent Office Application Serial No. 19876791.5, Search Report dated Sep. 30, 2022, 21 pages.
Wu et al., "A hybrid learning-based framework for blink image quality assessement," Multidimensional Systems and Signal Processing, Springer US, Boston, vol. 29, No. 3, Feb. 2017, 11 pages.
European Patent Office Application Serial No. 19876791.5, Search Report dated Jun. 20, 2022, 14 pages.
Korean Intellectual Property Office Application No. 10-2018-0126634, Office Action dated Jul. 1, 2023, 10 pages.

* cited by examiner (a)          (b)

(a)          (b)

SIGNAL PROCESSING DEVICE AND VIDEO DISPLAY DEVICE COMPRISING SAME

CROSS-REFERENCE TO RELATED APPLICATIONS

This application is a continuation of U.S. patent application Ser. No. 17/287,731, filed on Apr. 22, 2021, which is the National Stage filing under 35 U.S.C. 371 of International Application No. PCT/KR2019/013942, filed on Oct. 23, 2019, which claims the benefit of earlier filing date and right of priority to Korean Patent Application No. 10-2018-0126634, filed on Oct. 23, 2018, the contents of which are all hereby incorporated all by reference herein in their entirety.

BACKGROUND OF THE PRESENT DISCLOSURE

1. Field of the Invention

The present disclosure relates to a signal processing device and an image display apparatus including the same, and more particularly to a signal processing device capable of reducing flicker when an image quality is changed in response to a change in source quality of a received image signal, and an image display apparatus including the same.

2. Description of the Related Art

A signal processing device is a device that performs signal processing on an input image to display an image.

For example, the signal processing device receives a broadcast signal or an HDMI signal and performs signal processing based on the received broadcast or HDMI signal to output a processed image signal.

Meanwhile, with development of camera and broadcasting technologies, resolution and a vertical synchronization frequency of an input image have improved. Specifically, there are increasing need for image quality processing on an image having 4K resolution and 120 Hz vertical synchronization frequency.

Meanwhile, image quality measurement is critical for image quality processing.

Image quality measurement may be divided into a first method of measuring a relative quality compared to a reference image, and a second method of determining an absolute quality.

The first method is to obtain a relative difference in image quality through measurement, so it is easy to quantify and objectify the image quality.

On the contrary, the second method is to evaluate image quality without any reference, so it is difficult to objectify the image quality and thus the image quality is primarily evaluated subjectively.

Meanwhile, in the case where a broadcast image is received by an image display apparatus through an antenna or the like, a resolution and a compression bit rate of the broadcast image may be figured out through normalization information related to the broadcast image.

However, due to wide spread of IPTVs or cable TVs, a renormalized 2K or 4K image is input to an image display apparatus through an HDMI terminal or the like.

In such a case, information on a resolution and a compression bit rate of the original image or the source image may be lost and it is difficult for the image display apparatus to determine a quality of the image which is related to the resolution and the compression bit rate of the source image. As a result, it is difficult to set a quality adequate for the source image and, especially, realize the maximum performance of an image quality algorithm in the image display apparatus.

Meanwhile, if a channel or an input is changed during the display of a broadcast image received through an antenna, an input image signal is disconnected midway, such that an image quality is set by muting the screen for a moment and displaying a black screen, when the channel or input is changed.

However, if an image from a settop box is input through an HDMI terminal and the like, an HDMI signal is continuously input even when a channel is changed, such that if an image quality setting is changed abruptly, a problem occurs in that a user may perceive flicker on the screen.

SUMMARY OF THE INVENTION

It is an object of the present disclosure to provide a signal processing device capable of reducing flicker when an image quality is changed in response to a change in source quality of a received image signal, and an image display apparatus including the same.

It is another object of the present disclosure to provide a signal processing device capable of changing an image quality setting in real time when a source quality of a received image signal is changed, and an image display apparatus including the same.

It is another object of the present disclosure to provide a signal processing device capable of accurately calculating a source quality of a received image signal using a Deep Neural Network (DNN), and an image display apparatus including the same.

It is another object of the present disclosure to provide a signal processing device capable of accurately calculating a source quality of an image signal based on learning by updating a parameter for a DNN from a server, and an image display apparatus including the same.

It is another object of the present disclosure to provide an image display apparatus performing image quality processing appropriate for a resolution and a noise level of a receive image signal.

In accordance with an aspect of the present disclosure, the above and other objects can be accomplished by providing a signal processing device, including: a quality calculator configured to calculate a source quality of an image signal received from an external settop box or a network; an image quality setter configured to set an image quality of the image signal based on the calculated source quality; and an image quality processor configured to perform image quality processing on the image signal based on the set image quality, wherein in response to the source quality of the received image signal being changed at a first time point, the image quality setter changes an image quality setting sequentially from a first setting to a second setting; and based on the image quality setting changed sequentially from the first setting to the second setting, the image quality processor performs image quality processing.

Meanwhile, during image playback, in response to the source quality of the received image signal being changed at the first time point, the image quality setter may change the image quality setting sequentially from the first setting to the second setting.

Meanwhile, while the image signal is received from the settop box, in response to the source quality of the received image signal being changed at the first time point by a channel change or an input change, the image quality setter may change the image quality setting sequentially from the first setting to the second setting.

Meanwhile, the quality calculator may calculate a source resolution and a noise level of the received image signal.

Meanwhile, the quality calculator may calculate a resolution and a noise level of the received image signal by using a Deep Neural Network (DNN).

Meanwhile, the quality calculator may update a parameter for the DNN from a server, and may calculate the resolution and the noise level of the received image signal based on the updated parameter.

Meanwhile, the quality calculator may extract a first region and a second region from the image signal; may calculate the source resolution of the image signal based on the first region; and may calculate the noise level of the image signal based on the second region.

Meanwhile, the quality calculator may extract a region, having the most edge components in the image signal, as the first region; and may extract a region having the least edge components in the image signal, as the second region.

Meanwhile, as the calculated noise level increases, the image quality processor may increase a noise reduction intensity of the image signal.

Meanwhile, the quality calculator may calculate a source resolution, a noise level, and a compression level of the received image signal, and may calculate the compression level based on training data obtained by reducing a compression bit rate.

Meanwhile, as the calculated compression level increases, the image quality processor may decrease an enhancement intensity of the image signal.

Meanwhile, as the source resolution of the image signal increases, the image quality processor may increase the enhancement intensity of the image signal.

Meanwhile, as the calculated compression level increases, the image quality processor may increase a blurring intensity of the image signal.

Meanwhile, as the source resolution of the image signal increases, the image quality processor may reduce a size of a filter for filtering the image signal.

Meanwhile, the image quality processor may downscale the image signal based on the source resolution of the image signal, may perform image quality processing on the downscaled image signal, may upscale the image signal on which the image quality processing is performed, and may output the upscaled image signal.

In accordance with another aspect of the present disclosure, the above and other objects can be accomplished by providing a signal processing device, including: a quality calculator configured to calculate a source quality of an image signal received from an external settop box or a network; an image quality setter configured to set an image quality of the image signal based on the calculated source quality; and an image quality processor configured to perform image quality processing on the image signal based on the set image quality, wherein the quality calculator updates a parameter for a DNN from a server, and calculates a resolution and a noise level of the received image signal based on the updated parameter.

In accordance with another aspect of the present disclosure, the above and other objects can be accomplished by providing an image display apparatus, including: an image receiver configured to receive an image signal from an external settop box or a network; a signal processor configured to perform signal processing on the image signal received by the image receiver; and a display configured to display an image processed by the signal processor, wherein the signal processor includes: a quality calculator configured to calculate a source quality of an image signal received from an external settop box or a network; an image quality setter configured to set an image quality of the image signal based on the calculated source quality; and an image quality processor configured to perform image quality processing on the image signal based on the set image quality, wherein in response to the source quality of the received image signal being changed at a first time point, the image quality setter changes an image quality setting sequentially from a first setting to a second setting; and based on the image quality setting changed sequentially from the first setting to the second setting, the image quality processor performs image quality processing.

Meanwhile, the display may display a first object indicating a calculated source quality of the received image signal; and a second object indicating an image quality set based on the source quality.

Meanwhile, in response to the source quality of the received image signal being changed, the display may display the first object and the second object for a predetermined period of time.

Effects of the Invention

In accordance with an aspect of the present disclosure, a signal processing device includes: a quality calculator configured to calculate a source quality of an image signal received from an external settop box or a network; an image quality setter configured to set an image quality of the image signal based on the calculated source quality; and an image quality processor configured to perform image quality processing on the image signal based on the set image quality, wherein in response to the source quality of the received image signal being changed at a first time point, the image quality setter changes an image quality setting sequentially from a first setting to a second setting; and based on the image quality setting changed sequentially from the first setting to the second setting, the image quality processor performs image quality processing. Accordingly, it is possible to reduce flicker when the image quality is changed due to the change of the source quality of the received image signal. Particularly, when the source quality of the image signal is changed, the image quality may be changed smoothly rather than abruptly.

Meanwhile, during image playback, in response to the source quality of the received image signal being changed at the first time point, the image quality setter may change the image quality setting sequentially from the first setting to the second setting. Accordingly, it is possible to change the image quality setting in real time when the source quality of the received image signal is changed. Particularly, when the source quality of the image signal is changed, the image quality may be changed smoothly rather than abruptly.

Meanwhile, while the image signal is received from the settop box, in response to the source quality of the received image signal being changed at the first time point by a channel change or an input change, the image quality setter may change the image quality setting sequentially from the first setting to the second setting. Accordingly, it is possible to reduce flicker when the image quality is changed due to the change of the source quality of the received image signal. Particularly, when the source quality of the image signal is changed, the image quality may be changed smoothly rather than abruptly.

Meanwhile, the quality calculator may calculate a resolution and a noise level of the received image signal by using a Deep Neural Network (DNN). Accordingly, it is possible to accurately calculate the source quality of the received image signal.

Meanwhile, the quality calculator may update a parameter for the DNN from a server, and may calculate the resolution and the noise level of the received image signal based on the updated parameter. Accordingly, it is possible to accurately calculate the source quality of the received image signal based on learning.

Meanwhile, the quality calculator may extract a first region and a second region from the image signal; may calculate the source resolution of the image signal based on the first region; and may calculate the noise level of the image signal based on the second region. Accordingly, it is possible to accurately calculate the source quality of the received image signal based on image extraction appropriate for calculating the quality.

Meanwhile, the quality calculator may extract a region, having the most edge components in the image signal, as the first region; and may extract a region having the least edge components in the image signal, as the second region. Accordingly, it is possible to accurately calculate the source quality of the received image signal based on image extraction appropriate for calculating the quality.

Meanwhile, as the calculated noise level increases, the image quality processor may increase a noise reduction intensity of the image signal. Accordingly, it is possible to perform image quality processing appropriate for the noise level of the received image signal.

Meanwhile, the quality calculator may calculate a source resolution, a noise level, and a compression level of the received image signal, and may calculate the compression level based on training data obtained by reducing a compression bit rate.

Meanwhile, as the calculated compression level increases, the image quality processor may decrease an enhancement intensity of the image signal. Accordingly, it is possible to accurately calculate the compression level.

Meanwhile, as the source resolution of the image signal increases, the image quality processor may increase the enhancement intensity of the image signal. Accordingly, it is possible to perform image quality processing appropriate for the source resolution of the received image signal.

Meanwhile, as the calculated compression level increases, the image quality processor may increase a blurring intensity of the image signal. Accordingly, it is possible to perform image quality processing appropriate for the compression level of the received image signal.

Meanwhile, as the source resolution of the image signal increases, the image quality processor may reduce a size of a filter for filtering the image signal. Accordingly, it is possible to perform image quality processing appropriate for the source resolution of the received image signal.

Meanwhile, the image quality processor may downscale the image signal based on the source resolution of the image signal, may perform image quality processing on the downscaled image signal, may upscale the image signal on which the image quality processing is performed, and may output the upscaled image signal. Accordingly, it is possible to perform image quality processing appropriate for the source resolution of the received image signal.

In accordance with another aspect of the present disclosure, a signal processing device includes: a quality calculator configured to calculate a source quality of an image signal received from an external settop box or a network; an image quality setter configured to set an image quality of the image signal based on the calculated source quality; and an image quality processor configured to perform image quality processing on the image signal based on the set image quality, wherein the quality calculator updates a parameter for a DNN from a server, and calculates a resolution and a noise level of the received image signal based on the updated parameter. Accordingly, it is possible to accurately calculate the source quality of the received image signal based on learning.

In accordance with another aspect of the present disclosure, an image display apparatus includes: an image receiver configured to receive an image signal from an external settop box or a network; a signal processor configured to perform signal processing on the image signal received by the image receiver; and a display configured to display an image processed by the signal processor, wherein the signal processor includes: a quality calculator configured to calculate a source quality of an image signal received from an external settop box or a network; an image quality setter configured to set an image quality of the image signal based on the calculated source quality; and an image quality processor configured to perform image quality processing on the image signal based on the set image quality, wherein in response to the source quality of the received image signal being changed at a first time point, the image quality setter changes an image quality setting sequentially from a first setting to a second setting; and based on the image quality setting changed sequentially from the first setting to the second setting, the image quality processor performs image quality processing.

Accordingly, it is possible to reduce flicker when the image quality is changed due to the change of the source quality of the received image signal. Particularly, when the source quality of the image signal is changed, the image quality may be changed smoothly rather than abruptly.

Meanwhile, the display may display a first object indicating a calculated source quality of the received image signal; and a second object indicating an image quality set based on the source quality. Accordingly, a user may easily identify the source quality and the set image quality.

Meanwhile, in response to the source quality of the received image signal being changed, the display may display the first object and the second object for a predetermined period of time. Accordingly, when the source quality is changed, a user may easily identify the source quality and the set image quality.

DETAILED DESCRIPTION OF THE PREFERRED EMBODIMENTS

Hereinafter, the present disclosure will be described in detail with reference to the accompanying drawings.

With respect to constituent elements used in the following description, suffixes "module" and "unit" are given only in consideration of ease in the preparation of the specification, and do not have or serve as different meanings. Accordingly, the suffixes "module" and "unit" may be used interchangeably.

Figure 1:
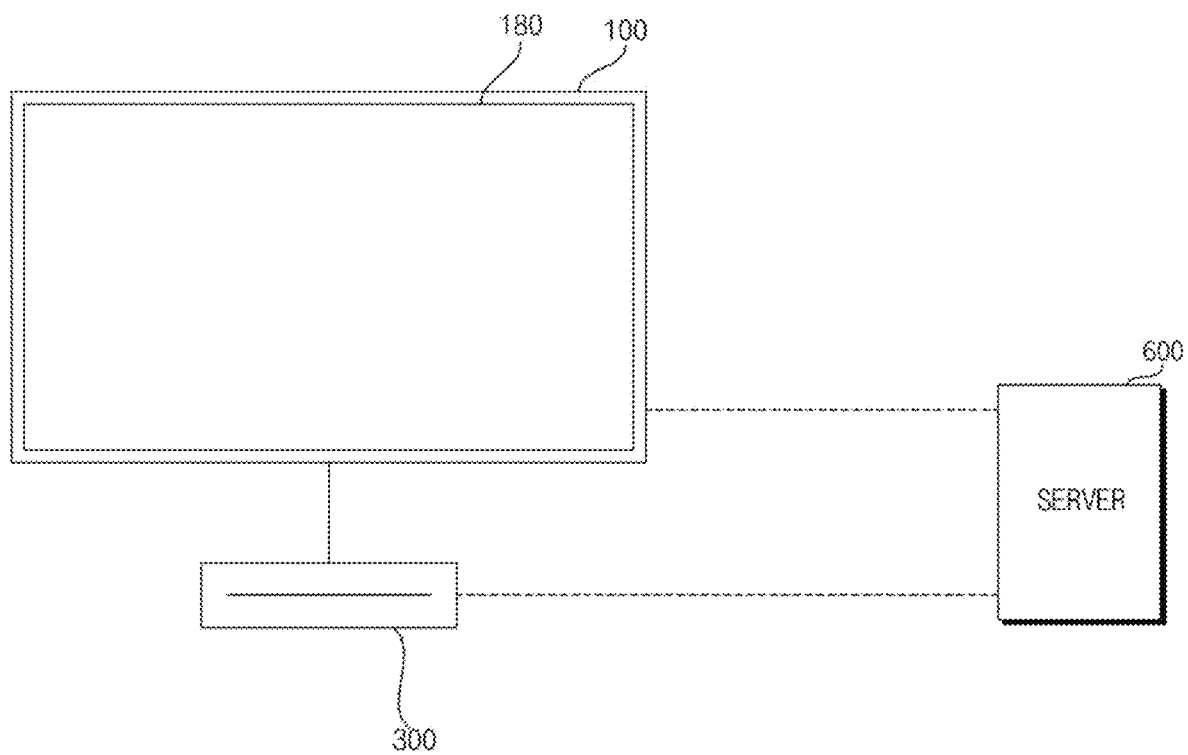
FIG. 1 is a diagram showing an image display system according to an embodiment of the present disclosure.

FIG. 1 is a diagram showing an image display system according to an embodiment of the present disclosure.

Referring to the drawing, an image display system 10 according to an embodiment of the present disclosure may include an image display apparatus 100 including a display 180, a settop box 300, and a server 600.

The image display apparatus 100 according to an embodiment of the present disclosure may receive an image from the settop box 300 or the server 600.

For example, the image display apparatus 100 may receive an image signal from the settop box 300 through an HDMI terminal.

For another example, the image display apparatus 100 may receive an image signal from the server 600 through a network terminal.

Meanwhile, the image display apparatus 100 may calculate a source quality of an image signal received through an external settop box 300 or a network, set an image quality of the image signal based on the calculated source quality, and perform image quality processing on the image signal based on the set image quality.

Meanwhile, if a source quality of a received image signal is changed at a first time point, the image display apparatus 100 may change an image quality setting sequentially from a first setting to a second setting, and may perform image quality processing based on the image quality setting changed sequentially from the first setting to the second setting. Accordingly, it is possible to reduce flicker when the image quality is changed due to the change of the source quality of the received image signal. Particularly, when the source quality of the image signal is changed, the quality may be changed smoothly rather than abruptly.

Particularly, if a source quality of a received image signal is changed by a channel change or an input change while an image is played, the image display apparatus 100 may change an image quality setting sequentially from a first setting to a second setting. Accordingly, when the source quality of the received image signal is changed, it is possible to change the image quality setting in real time. Particularly, when the source quality of the image signal is changed, the image quality may be changed smoothly rather than abruptly.

Meanwhile, the image display apparatus 100 may calculate a resolution and a noise level of a received image signal using a Deep Neural Network (DNN). Accordingly, it is possible to accurately calculate a source quality of the received image signal.

Meanwhile, the image display apparatus 100 may update a parameter for the DNN from the server 600, and calculate a resolution and a noise level of the received image signal based on the updated parameter. Accordingly, it is possible to accurately calculate a source quality of the received image signal based on learning.

Meanwhile, the display 180 may be implemented with any one of various panels. For example, the display 180 may be any one of a liquid crystal display panel (LCD panel), an organic light emitting diode panel (OLED panel), an inorganic light emitting diode panel (LED panel).

In the present disclosure, an example in which the display 180 includes the organic light emitting diode panel (OLED panel) is mainly described.

Meanwhile, the OLED panel exhibits a faster response speed than the LED and is excellent in color reproduction.

Accordingly, if the display 180 includes an OLED panel, it is preferable that the signal processor 170 (see FIG. 2) of the image display apparatus 100 performs image quality processing for the OLED panel. Meanwhile, the signal processor may be called a signal processing device.

Meanwhile, the image display apparatus 100 in FIG. 1 may be a TV, a monitor, a tablet PC, a mobile terminal, a display for a vehicle, etc.

Figure 2:
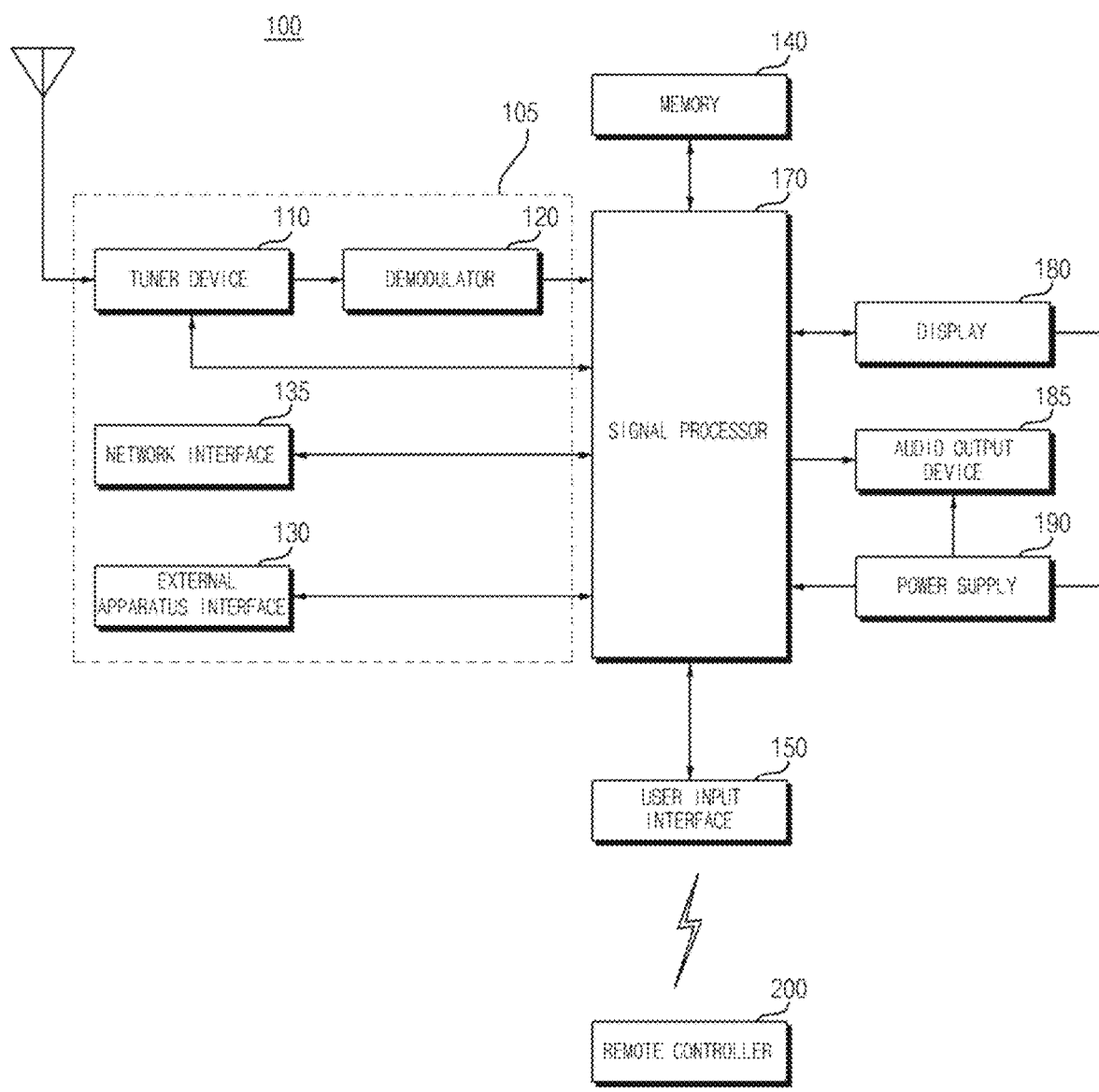
FIG. 2 is an example of an internal block diagram of the image display apparatus of FIG. 1.

FIG. 2 is an example of an internal block diagram of the image display apparatus of FIG. 1.

Referring to FIG. 2, the image display apparatus 100 according to an embodiment of the present disclosure includes an image receiver 105, a memory 140, a user input interface 150, a sensor unit (not shown), a signal processor 170, a display 180, and an audio output device 185.

The image receiver 105 may include a tuner device 110, a demodulator 120, a network interface 135, and an external apparatus interface 130.

Meanwhile, unlike the drawing, the image receiver 105 may include only the tuner device 110, the demodulator 120, and the external apparatus interface 130. That is, the network interface 135 may not be included.

The tuner device 110 selects an RF broadcast signal corresponding to a channel selected by a user or all pre-stored channels among radio frequency (RF) broadcast signals received through an antenna (not shown). In addition, the selected RF broadcast signal is converted into an intermediate frequency signal, a baseband image, or a audio signal.

For example, if the selected RF broadcast signal is a digital broadcast signal, it is converted into a digital IF signal (DIF). If the selected RF broadcast signal is an analog broadcast signal, it is converted into an analog baseband image or audio signal (CVBS/SIF). That is, the tuner device 110 can process a digital broadcast signal or an analog broadcast signal. The analog baseband image or audio signal (CVBS/SIF) output from the tuner device 110 may be directly input to the signal processor 170.

Meanwhile, the tuner device 110 can include a plurality of tuners for receiving broadcast signals of a plurality of channels. Alternatively, a single tuner that simultaneously receives broadcast signals of a plurality of channels is also available.

The demodulator 120 receives the converted digital IF signal DIF from the tuner device 110 and performs a demodulation operation.

The demodulator 120 may perform demodulation and channel decoding and then output a stream signal TS. At this time, the stream signal may be a demultiplexed signal of an image signal, an audio signal, or a data signal.

The stream signal output from the demodulator 120 may be input to the signal processor 170. The signal processor 170 performs demultiplexing, image/audio signal processing, and the like, and then outputs an image to the display 180 and outputs audio to the audio output device 185.

The external apparatus interface 130 may transmit or receive data with a connected external apparatus (not shown), e.g., a settop box 50. To this end, the external apparatus interface 130 may include an A/V input and output device (not shown).

The external apparatus interface 130 may be connected in wired or wirelessly to an external apparatus such as a digital versatile disk (DVD), a Blu ray, a game equipment, a camera, a camcorder, a computer (note book), and a settop box, and may perform an input/output operation with an external apparatus.

The A/V input and output device may receive image and audio signals from an external apparatus. Meanwhile, a wireless communicator (not shown) may perform short-range wireless communication with other electronic apparatus.

Through the wireless communicator (not shown), the external apparatus interface 130 may exchange data with an adjacent mobile terminal 600. In particular, in a mirroring mode, the external apparatus interface 130 may receive device information, executed application information, application image, and the like from the mobile terminal 600.

The network interface 135 provides an interface for connecting the image display apparatus 100 to a wired/wireless network including the Internet network. For example, the network interface 135 may receive, via the network, content or data provided by the Internet, a content provider, or a network operator.

Meanwhile, the network interface 135 may include a wireless communicator (not shown).

The memory 140 may store a program for each signal processing and control in the signal processor 170, and may store a signal-processed image, audio, or data signal.

In addition, the memory 140 may serve to temporarily store image, audio, or data signal input to the external apparatus interface 130. In addition, the memory 140 may store information on a certain broadcast channel through a channel memory function such as a channel map.

Although FIG. 2 illustrates that the memory is provided separately from the signal processor 170, the scope of the present disclosure is not limited thereto. The memory 140 may be included in the signal processor 170.

The user input interface 150 transmits a signal input by the user to the signal processor 170 or transmits a signal from the signal processor 170 to the user.

For example, it may transmit/receive a user input signal such as power on/off, channel selection, screen setting, etc., from a remote controller 200, may transfer a user input signal input from a local key (not shown) such as a power key, a channel key, a volume key, a set value, etc., to the signal processor 170, may transfer a user input signal input from a sensor unit (not shown) that senses a user's gesture to the signal processor 170, or may transmit a signal from the signal processor 170 to the sensor unit (not shown).

The signal processor 170 may demultiplex the input stream through the tuner device 110, the demodulator 120, the network interface 135, or the external apparatus interface 130, or process the demultiplexed signals to generate and output a signal for image or audio output.

For example, the signal processor 170 receives a broadcast signal received by the image receiver 105 or an HDMI signal, and perform signal processing based on the received broadcast signal or the HDMI signal to thereby output a signal-processed image signal.

The image signal processed by the signal processor 170 is input to the display 180, and may be displayed as an image corresponding to the image signal. In addition, the image signal processed by the signal processor 170 may be input to the external output apparatus through the external apparatus interface 130.

The audio signal processed by the signal processor 170 may be output to the audio output device 185 as an audio signal. In addition, audio signal processed by the signal processor 170 may be input to the external output apparatus through the external apparatus interface 130.

Although not shown in FIG. 2, the signal processor 170 may include a demultiplexer, an image processor, and the like. That is, the signal processor 170 may perform a variety of signal processing and thus it may be implemented in the form of a system on chip (SOC). This will be described later with reference to FIG. 3.

In addition, the signal processor 170 can control the overall operation of the image display apparatus 100. For example, the signal processor 170 may control the tuner device 110 to control the tuning of the RF broadcast corresponding to the channel selected by the user or the previously stored channel.

In addition, the signal processor 170 may control the image display apparatus 100 based on a user command input through the user input interface 150 or an internal program.

Meanwhile, the signal processor 170 may control the display 180 to display an image. At this time, the image displayed on the display 180 may be a still image or a moving image, and may be a 2D image or a 3D image.

Meanwhile, the signal processor 170 may display a certain object in an image displayed on the display 180. For example, the object may be at least one of a connected web screen (newspaper, magazine, etc.), an electronic program guide (EPG), various menus, a widget, an icon, a still image, a moving image, and a text.

Meanwhile, the signal processor 170 may recognize the position of the user based on the image photographed by a photographer (not shown). For example, the distance (z-axis coordinate) between a user and the image display apparatus 100 can be determined. In addition, the x-axis coordinate and the y-axis coordinate in the display 180 corresponding to a user position can be determined.

The display 180 generates a driving signal by converting an image signal, a data signal, an OSD signal, a control signal processed by the signal processor 170, an image signal, a data signal, a control signal, and the like received from the external apparatus interface 130.

Meanwhile, the display 180 may be configured as a touch screen and used as an input device in addition to an output device.

The audio output device 185 receives a signal processed by the signal processor 170 and outputs it as an audio.

The photographer (not shown) photographs a user. The photographer (not shown) may be implemented by a single camera, but the present disclosure is not limited thereto and may be implemented by a plurality of cameras. Image information photographed by the photographer (not shown) may be input to the signal processor 170.

The signal processor 170 may sense a gesture of the user based on each of the images photographed by the photographer (not shown), the signals detected from the sensor unit (not shown), or a combination thereof.

The power supply 190 supplies corresponding power to the image display apparatus 100. Particularly, the power may be supplied to a controller 170 which can be implemented in the form of a system on chip (SOC), a display 180 for displaying an image, and an audio output device 185 for outputting an audio.

Specifically, the power supply 190 may include a converter for converting an AC power into a DC power, and a DC/DC converter for converting the level of the DC power.

The remote controller 200 transmits the user input to the user input interface 150. To this end, the remote controller 200 may use Bluetooth, a radio frequency (RF) communication, an infrared (IR) communication, an Ultra Wideband (UWB), ZigBee, or the like. In addition, the remote controller 200 may receive the image, audio, or data signal output from the user input interface 150, and display it on the remote controller 200 or output it as an audio.

Meanwhile, the image display apparatus 100 may be a fixed or mobile digital broadcasting receiver capable of receiving digital broadcasting.

Meanwhile, a block diagram of the image display apparatus 100 shown in FIG. 2 is a block diagram for an embodiment of the present disclosure. Each component of the block diagram may be integrated, added, or omitted according to a specification of the image display apparatus 100 actually implemented. That is, two or more components may be combined into a single component as needed, or a single component may be divided into two or more components. The function performed in each block is described for the purpose of illustrating embodiments of the present disclosure, and specific operation and apparatus do not limit the scope of the present disclosure.

Figure 3:
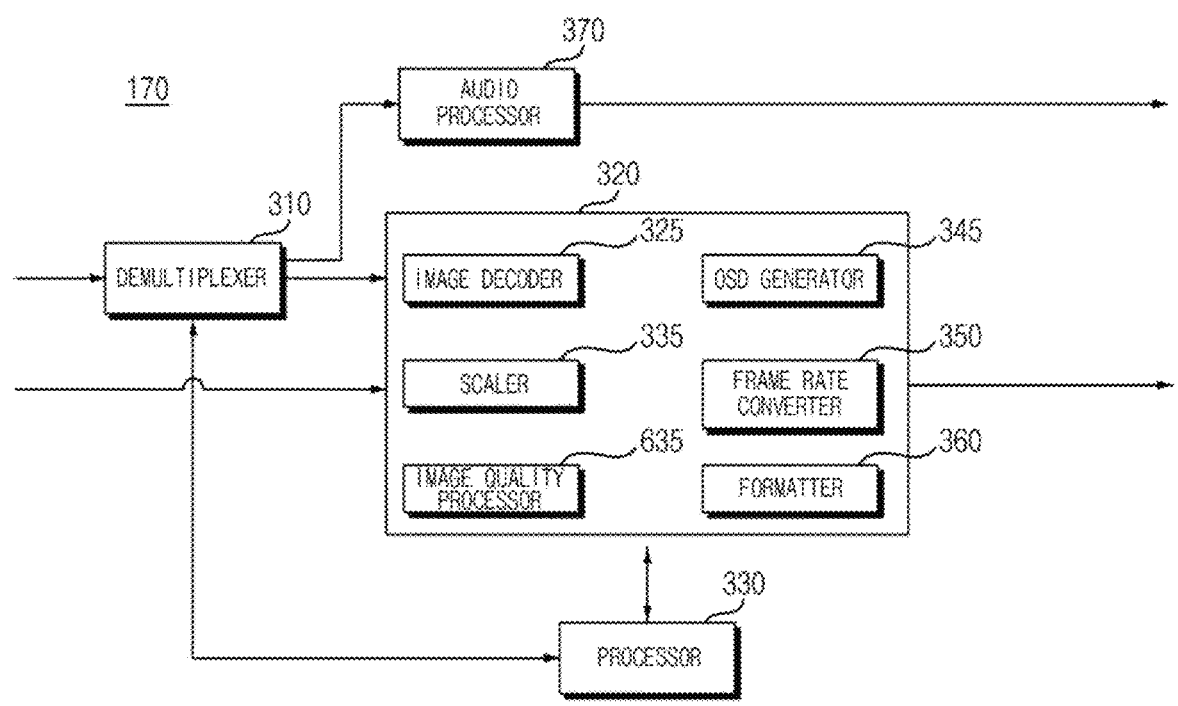
FIG. 3 is an example of an internal block diagram of the signal processor in FIG. 2.

FIG. 3 is an example of an internal block diagram of the signal processor in FIG. 2.

Referring to the drawing, the signal processor 170 according to an embodiment of the present disclosure may include a demultiplexer 310, an image processor 320, a processor 330, and an audio processor 370. In addition, the signal processor 170 may further include and a data processor (not shown).

The demultiplexer 310 demultiplexes the input stream. For example, when an MPEG-2 TS is input, it can be demultiplexed into image, audio, and data signal, respectively. Here, the stream signal input to the demultiplexer 310 may be a stream signal output from the tuner device 110, the demodulator 120, or the external apparatus interface 130.

The image processor 320 may perform signal processing on an input image. For example, the image processor 320 may perform image processing on an image signal demultiplexed by the demultiplexer 310.

To this end, the image processor 320 may include an image decoder 325, a scaler 335, an image quality processor 635, an image encoder (not shown), an OSD processor 340, a frame rate converter 350, a formatter 360, etc.

The image decoder 325 decodes a demultiplexed image signal, and the scaler 335 performs scaling so that the resolution of the decoded image signal can be output from the display 180.

The image decoder 325 can include a decoder of various standards. For example, a 3D image decoder for MPEG-2, H.264 decoder, a color image, and a depth image, and a decoder for a plurality of view image may be provided.

The scaler 335 may scale an input image signal decoded by the image decoder 325 or the like.

For example, if the size or resolution of an input image signal is small, the scaler 335 may upscale the input image signal, and, if the size or resolution of the input image signal is great, the scaler 335 may downscale the input image signal.

The image quality processor 635 may perform image quality processing on an input image signal decoded by the image decoder 325 or the like.

For example, the image quality processor 625 may perform noise reduction processing on an input image signal, extend a resolution of high gray level of the input image signal, perform image resolution enhancement, perform high dynamic range (HDR)-based signal processing, change a frame rate, perform image quality processing appropriate for properties of a panel, especially an OLED panel, etc.

The OSD processor 340 generates an OSD signal based on a user input or by itself. For example, based on a user input signal, the OSD processor 340 may generate a signal for displaying various information as a graphic or a text on the screen of the display 180. The generated OSD signal may include various data such as a user interface screen of the image display apparatus 100, various menu screens, a widget, and an icon. In addition, the generated OSD signal may include a 2D object or a 3D object.

In addition, the OSD processor 340 may generate a pointer that can be displayed on the display, based on a pointing signal input from the remote controller 200. In particular, such a pointer may be generated by a pointing signal processor, and the OSD processor 340 may include such a pointing signal processor (not shown). Obviously, the pointing signal processor (not shown) may be provided separately from the OSD processor 340.

The Frame Rate Converter (FRC) 350 may convert a frame rate of the input image. The frame rate converter 350 may output the image as it is without separate frame rate conversion.

Meanwhile, the formatter 360 may change a format of an input image signal into a format suitable for displaying the image signal on a display and output the image signal in the changed format.

In particular, the formatter 360 may change a format of an image signal to correspond to a display panel.

The processor 330 may control overall operations of the image display apparatus 100 or the signal processor 170.

For example, the processor 330 may control the tuner device 110 to control the tuning of an RF broadcast corresponding to a channel selected by a user or a previously stored channel.

In addition, the processor 330 may control the image display apparatus 100 based on a user command input through the user input interface 150 or an internal program.

In addition, the processor 330 may transmit data to the network interface 135 or to the external apparatus interface 130.

In addition, the processor 330 may control the demultiplexer 310, the image processor 320, and the like in the signal processor 170.

Meanwhile, the audio processor 370 in the signal processor 170 may perform the audio processing of the demultiplexed audio signal. To this end, the audio processor 370 may include various decoders.

In addition, the audio processor 370 in the signal processor 170 may process a base, a treble, a volume control, and the like.

The data processor (not shown) in the signal processor 170 may perform data processing of the demultiplexed data signal. For example, when the demultiplexed data signal is a coded data signal, it can be decoded. The encoded data signal may be electronic program guide information including broadcast information such as a start time and an end time of a broadcast program broadcasted on each channel.

Meanwhile, a block diagram of the signal processor 170 shown in FIG. 3 is a block diagram for an embodiment of the present disclosure. Each component of the block diagram may be integrated, added, or omitted according to a specification of the signal processor 170 actually implemented.

In particular, the frame rate converter 350 and the formatter 360 may be provided separately in addition to the image processor 320.

Figure 4A:
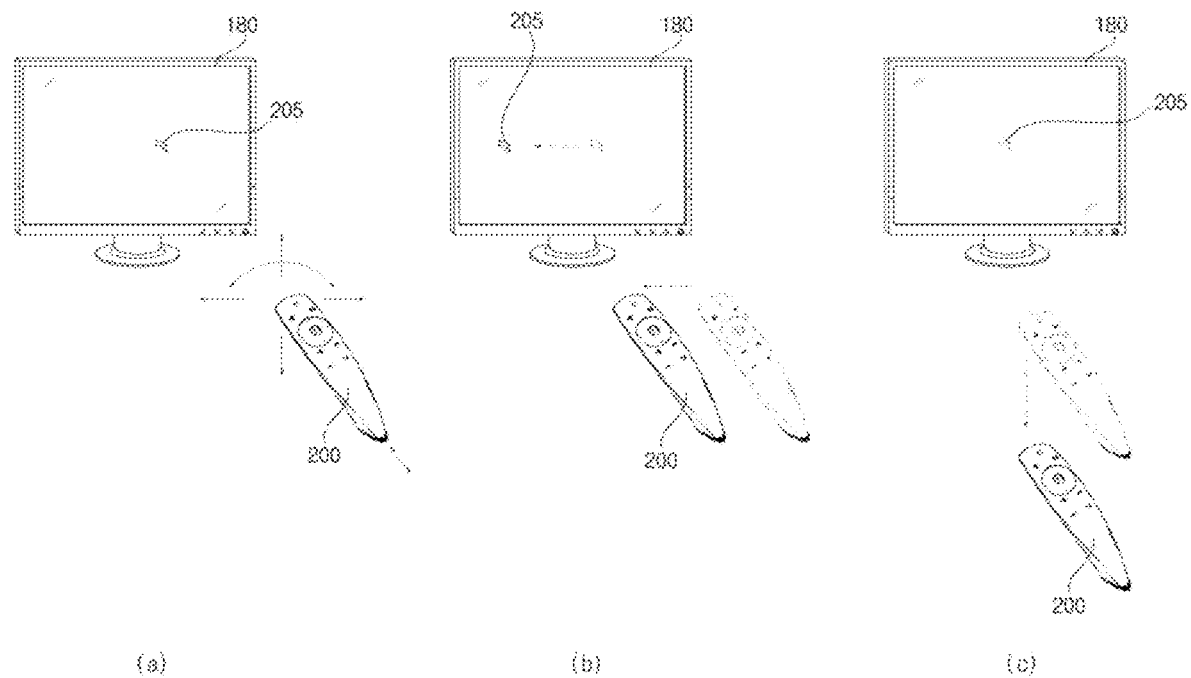
FIG. 4A is a diagram illustrating a control method of a remote controller of FIG. 2.

FIG. 4A is a diagram illustrating a control method of a remote controller of FIG. 2.

As shown in FIG. 4A(a), it is illustrated that a pointer 205 corresponding to the remote controller 200 is displayed on the display 180.

The user may move or rotate the remote controller 200 up and down, left and right (FIG. 4A(b)), and back and forth (FIG. 4A(c)). The pointer 205 displayed on the display 180 of the image display apparatus corresponds to the motion of the remote controller 200. Such a remote controller 200 may be referred to as a space remote controller or a 3D pointing apparatus, because the pointer 205 is moved and displayed based on the movement in a 3D space, as shown in the drawing.

FIG. 4A(b) illustrates that when the user moves the remote controller 200 to the left, the pointer 205 displayed on the display 180 of the image display apparatus also moves to the left correspondingly.

Information on the motion of the remote controller 200 detected through a sensor of the remote controller 200 is transmitted to the image display apparatus. The image display apparatus may calculate the coordinate of the pointer 205 from the information on the motion of the remote controller 200. The image display apparatus may display the pointer 205 to correspond to the calculated coordinate.

FIG. 4A(c) illustrates a case where the user moves the remote controller 200 away from the display 180 while pressing a specific button of the remote controller 200. Thus, a selection area within the display 180 corresponding to the pointer 205 may be zoomed in so that it can be displayed to be enlarged. On the other hand, when the user moves the remote controller 200 close to the display 180, the selection area within the display 180 corresponding to the pointer 205 may be zoomed out so that it can be displayed to be reduced. Meanwhile, when the remote controller 200 moves away from the display 180, the selection area may be zoomed out, and when the remote controller 200 approaches the display 180, the selection area may be zoomed in.

Meanwhile, when the specific button of the remote controller 200 is pressed, it is possible to exclude the recognition of vertical and lateral movement. That is, when the remote controller 200 moves away from or approaches the display 180, the up, down, left, and right movements are not recognized, and only the forward and backward movements are recognized. Only the pointer 205 is moved according to the up, down, left, and right movements of the remote controller 200 in a state where the specific button of the remote controller 200 is not pressed.

Meanwhile, the moving speed or the moving direction of the pointer 205 may correspond to the moving speed or the moving direction of the remote controller 200.

Figure 4B:
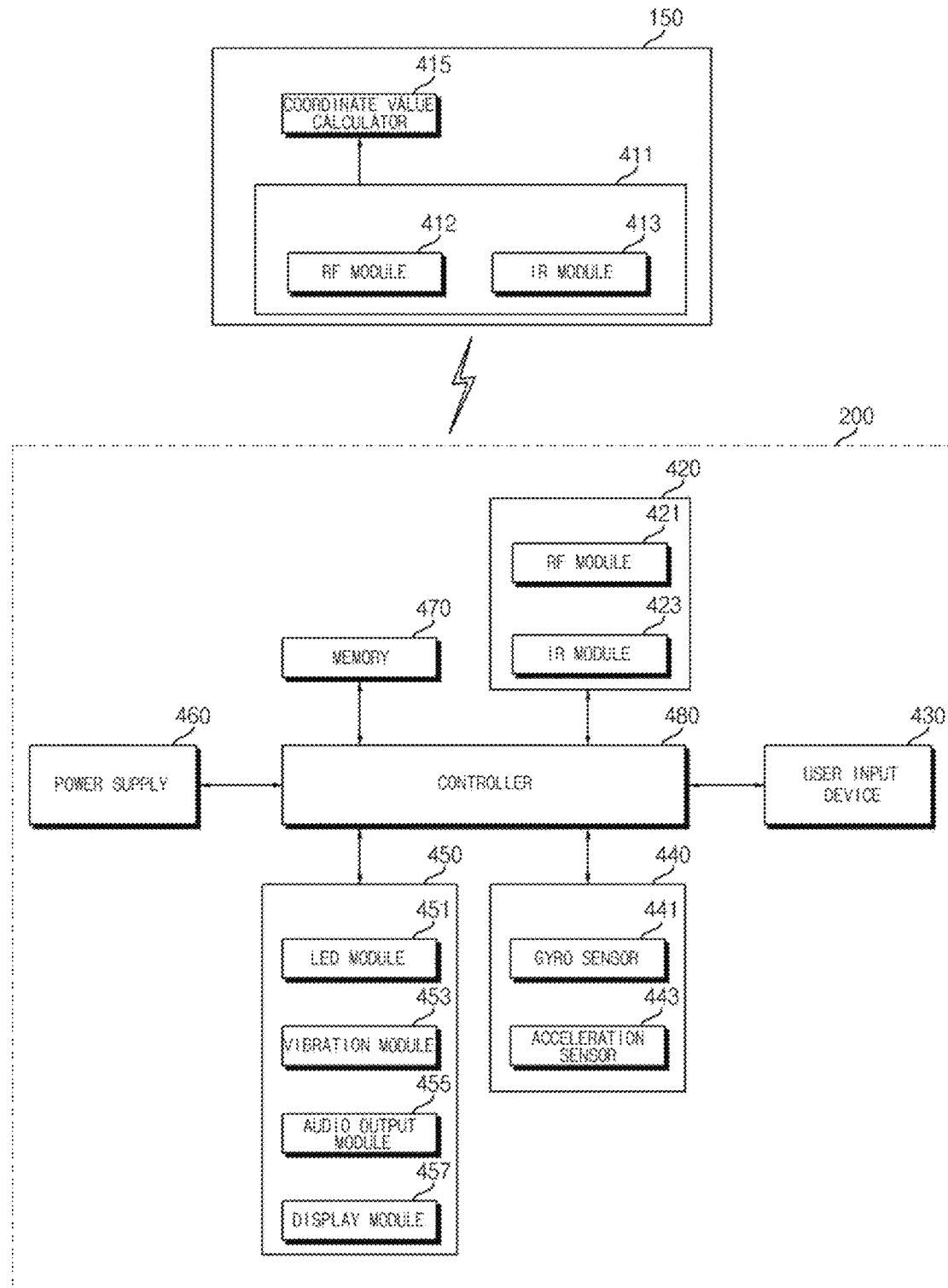
FIG. 4B is an internal block diagram of the remote controller of FIG. 2.

FIG. 4B is an internal block diagram of the remote controller of FIG. 2.

Referring to the drawing, the remote controller 200 includes a wireless communicator 425, a user input device 435, a sensor unit 440, an output device 450, a power supply 460, a memory 470, and a controller 480.

The wireless communicator 425 transmits/receives a signal to/from any one of the image display apparatuses according to the embodiments of the present disclosure described above. Among the image display apparatuses according to the embodiments of the present disclosure, one image display apparatus 100 will be described as an example.

In the present embodiment, the remote controller 200 may include an RF module 421 for transmitting and receiving signals to and from the image display apparatus 100 according to a RF communication standard. In addition, the remote controller 200 may include an IR module 423 for transmitting and receiving signals to and from the image display apparatus 100 according to a IR communication standard.

In the present embodiment, the remote controller 200 transmits a signal containing information on the motion of the remote controller 200 to the image display apparatus 100 through the RF module 421.

In addition, the remote controller 200 may receive the signal transmitted by the image display apparatus 100 through the RF module 421. In addition, if necessary, the remote controller 200 may transmit a command related to power on/off, channel change, volume change, and the like to the image display apparatus 100 through the IR module 423.

The user input device 435 may be implemented by a keypad, a button, a touch pad, a touch screen, or the like. The user may operate the user input device 435 to input a command related to the image display apparatus 100 to the remote controller 200. When the user input device 435 includes a hard key button, the user can input a command related to the image display apparatus 100 to the remote controller 200 through a push operation of the hard key button. When the user input device 435 includes a touch screen, the user may touch a soft key of the touch screen to input the command related to the image display apparatus 100 to the remote controller 200. In addition, the user input device 435 may include various types of input means such as a scroll key, a jog key, etc., which can be operated by the user, and the present disclosure does not limit the scope of the present disclosure.

The sensor unit 440 may include a gyro sensor 441 or an acceleration sensor 443. The gyro sensor 441 may sense information about the motion of the remote controller 200.

For example, the gyro sensor 441 may sense information on the operation of the remote controller 200 based on the x, y, and z axes. The acceleration sensor 443 may sense information on the moving speed of the remote controller 200. Meanwhile, a distance measuring sensor may be further provided, and thus, the distance to the display 180 may be sensed.

The output device 450 may output an image or an audio signal corresponding to the operation of the user input device 435 or a signal transmitted from the image display apparatus 100. Through the output device 450, the user may recognize whether the user input device 435 is operated or whether the image display apparatus 100 is controlled.

For example, the output device 450 may include an LED module 451 that is turned on when the user input device 435 is operated or a signal is transmitted/received to/from the image display apparatus 100 through the wireless communicator 425, a vibration module 453 for generating a vibration, an audio output module 455 for outputting an audio, or a display module 457 for outputting an image.

The power supply 460 supplies power to the remote controller 200. When the remote controller 200 is not moved for a certain time, the power supply 460 may stop the supply of power to reduce a power waste. The power supply 460 may resume power supply when a certain key provided in the remote controller 200 is operated.

The memory 470 may store various types of programs, application data, and the like necessary for the control or operation of the remote controller 200. If the remote controller 200 wirelessly transmits and receives a signal to/from the image display apparatus 100 through the RF module 421, the remote controller 200 and the image display apparatus 100 transmit and receive a signal through a certain frequency band. The controller 480 of the remote controller 200 may store information about a frequency band or the like for wirelessly transmitting and receiving a signal to/from the image display apparatus 100 paired with the remote controller 200 in the memory 470 and may refer to the stored information.

The controller 480 controls various matters related to the control of the remote controller 200. The controller 480 may transmit a signal corresponding to a certain key operation of the user input device 435 or a signal corresponding to the motion of the remote controller 200 sensed by the sensor unit 440 to the image display apparatus 100 through the wireless communicator 425.

The user input interface 150 of the image display apparatus 100 includes a wireless communicator 151 that can wirelessly transmit and receive a signal to and from the remote controller 200 and a coordinate value calculator 415 that can calculate the coordinate value of a pointer corresponding to the operation of the remote controller 200.

The user input interface 150 may wirelessly transmit and receive a signal to and from the remote controller 200 through the RF module 412. In addition, the user input interface 150 may receive a signal transmitted by the remote controller 200 through the IR module 413 according to a IR communication standard.

The coordinate value calculator 415 may correct a hand shake or an error from a signal corresponding to the operation of the remote controller 200 received through the wireless communicator 151 and calculate the coordinate value (x, y) of the pointer 205 to be displayed on the display 180.

The transmission signal of the remote controller 200 inputted to the image display apparatus 100 through the user input interface 150 is transmitted to the controller 180 of the image display apparatus 100. The controller 180 may determine the information on the operation of the remote controller 200 and the key operation from the signal transmitted from the remote controller 200, and, correspondingly, control the image display apparatus 100.

For another example, the remote controller 200 may calculate the pointer coordinate value corresponding to the operation and output it to the user input interface 150 of the image display apparatus 100. In this case, the user input interface 150 of the image display apparatus 100 may transmit information on the received pointer coordinate value to the controller 180 without a separate correction process of hand shake or error.

For another example, unlike the drawing, the coordinate value calculator 415 may be provided in the signal processor 170, not in the user input interface 150.

Figure 5:
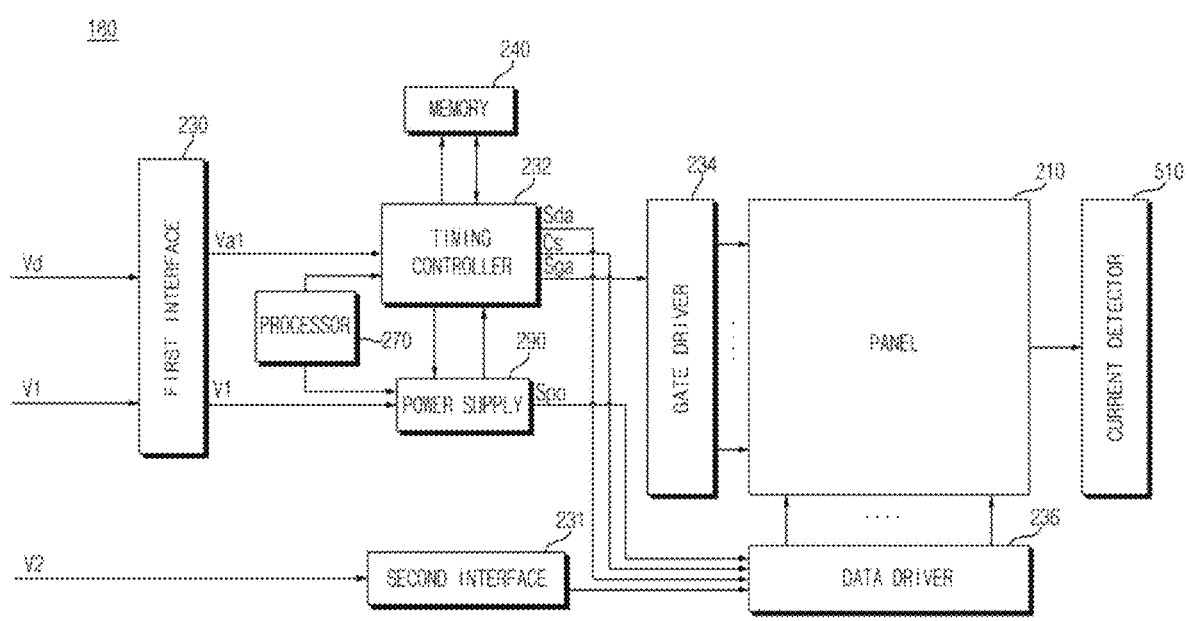
FIG. 5 is an internal block diagram of a display of FIG. 2.

FIG. 5 is an internal block diagram of a display of FIG. 2.

Referring to FIG. 5, the organic light emitting diode panel-based display 180 may include an organic light emitting diode panel 210, a first interface 230, a second interface 231, a timing controller 232, a gate driver 234, a data driver 236, a memory 240, a processor 270, a power supply 290, a current detector 510, and the like.

The display 180 receives an image signal Vd, a first DC power V1, and a second DC power V2, and may display a certain image based on the image signal Vd.

Meanwhile, the first interface 230 in the display 180 may receive the image signal Vd and the first DC power V1 from the signal processor 170.

Here, the first DC power V1 may be used for the operation of the power supply 290 and the timing controller 232 in the display 180.

Next, the second interface 231 may receive a second DC power V2 from an external power supply 190. Meanwhile, the second DC power V2 may be input to the data driver 236 in the display 180.

The timing controller 232 may output a data driving signal Sda and a gate driving signal Sga, based on the image signal Vd.

For example, when the first interface 230 converts the input image signal Vd and outputs the converted image signal val, the timing controller 232 may output the data driving signal Sda and the gate driving signal Sga based on the converted image signal val.

The timing controller 232 may further receive a control signal, a vertical synchronization signal Vsync, and the like, in addition to the image signal Vd from the signal processor 170.

In addition to the image signal Vd, based on a control signal, a vertical synchronization signal Vsync, and the like, the timing controller 232 generates a gate driving signal Sga for the operation of the gate driver 234, and a data driving signal Sda for the operation of the data driver 236.

At this time, when the panel 210 includes a RGBW subpixel, the data driving signal Sda may be a data driving signal for driving of RGBW subpixel.

Meanwhile, the timing controller 232 may further output a control signal Cs to the gate driver 234.

The gate driver 234 and the data driver 236 supply a scan signal and an image signal to the organic light emitting diode panel 210 through a gate line GL and a data line DL respectively, according to the gate driving signal Sga and the data driving signal Sda from the timing controller 232. Accordingly, the organic light emitting diode panel 210 displays a certain image.

Meanwhile, the organic light emitting diode panel 210 may include an organic light emitting layer. In order to display an image, a plurality of gate lines GL and data lines DL may be disposed in a matrix form in each pixel corresponding to the organic light emitting layer.

Meanwhile, the data driver 236 may output a data signal to the organic light emitting diode panel 210 based on a second DC power V2 from the second interface 231.

The power supply 290 may supply various power supplies to the gate driver 234, the data driver 236, the timing controller 232, and the like.

The current detector 510 may detect the current flowing in a sub-pixel of the organic light emitting diode panel 210. The detected current may be input to the processor 270 or the like, for a cumulative current calculation.

The processor 270 may perform each type of control of the display 180. For example, the processor 270 may control the gate driver 234, the data driver 236, the timing controller 232, and the like.

Meanwhile, the processor 270 may receive current information flowing in a sub-pixel of the organic light emitting diode panel 210 from the current detector 510.

In addition, the processor 270 may calculate the accumulated current of each subpixel of the organic light emitting diode panel 210, based on information of current flowing through the subpixel of the organic light emitting diode panel 210. The calculated accumulated current may be stored in the memory 240.

Meanwhile, the processor 270 may determine as burn-in, if the accumulated current of each sub-pixel of the organic light emitting diode panel 210 is equal to or greater than an allowable value.

For example, if the accumulated current of each subpixel of the OLED panel 210 is equal to or higher than 300000 A, the processor 270 may determine that a corresponding subpixel is a burn-in subpixel.

Meanwhile, if the accumulated current of each subpixel of the OLED panel 210 is close to an allowable value, the processor 270 may determine that a corresponding subpixel is a subpixel expected to be burn in.

Meanwhile, based on a current detected by the current detector 510, the processor 270 may determine that a subpixel having the greatest accumulated current is an expected burn-in subpixel.

Figure 6A:
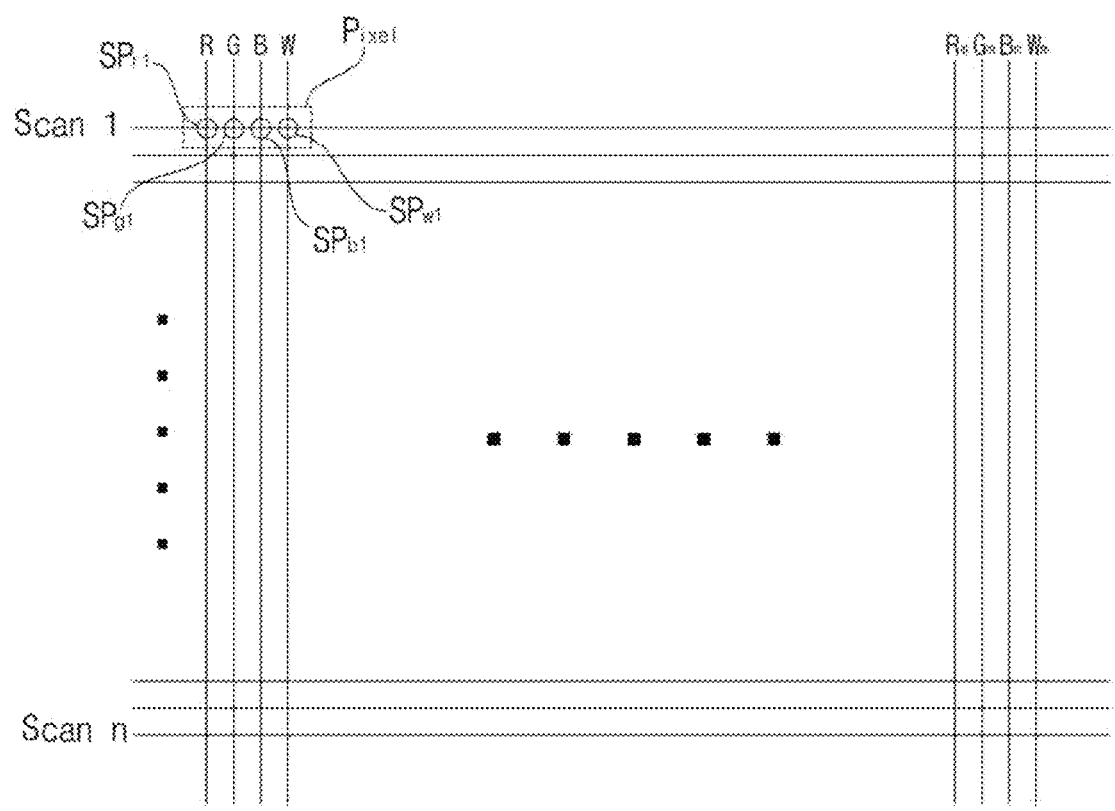
FIG. 6A and FIG. 6B are diagrams referred to in the description of an organic light emitting diode panel of FIG. 5.
Figure 6B:
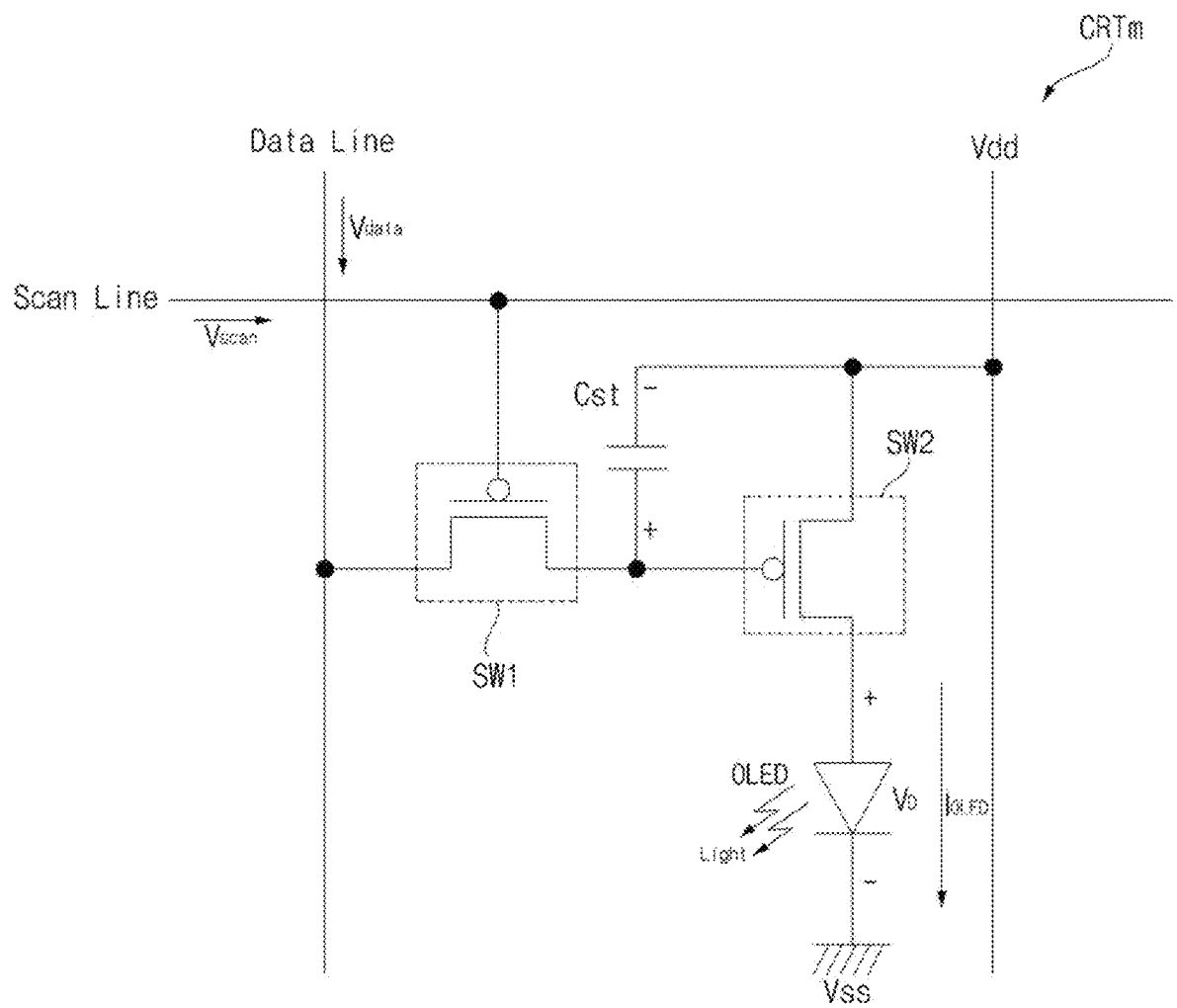

FIG. 6A and FIG. 6B are diagrams referred to in the description of an organic light emitting diode panel of FIG. 5.

Firstly, FIG. 6A is a diagram illustrating a pixel in the organic light emitting diode panel 210.

Referring to drawing, the organic light emitting diode panel 210 may include a plurality of scan lines Scan1 to Scann and a plurality of data lines R1, G1, B1, W1 to Rm, Gm, Bm, Wm intersecting the scan lines.

Meanwhile, a pixel (subpixel) is defined in an intersecting area of the scan line and the data line in the organic light emitting diode panel 210. In the drawing, a pixel including sub-pixels SR1, SG1, SB1 and SW1 of RGBW is shown.

FIG. 6B illustrates a circuit of any one sub-pixel in the pixel of the organic light emitting diode panel of FIG. 6A.

Referring to drawing, an organic light emitting sub pixel circuit (CRTm) may include, as an active type, a scan switching element SW1, a storage capacitor Cst, a drive switching element SW2, and an organic light emitting layer (OLED).

The scan switching element SW1 is turned on according to the input scan signal Vdscan, as a scan line is connected to a gate terminal. When it is turned on, the input data signal Vdata is transferred to the gate terminal of a drive switching element SW2 or one end of the storage capacitor Cst.

The storage capacitor Cst is formed between the gate terminal and the source terminal of the drive switching element SW2, and stores a certain difference between a data signal level transmitted to one end of the storage capacitor Cst and a DC power (VDD) level transmitted to the other terminal of the storage capacitor Cst.

For example, when the data signal has a different level according to a Plume Amplitude Modulation (PAM) method, the power level stored in the storage capacitor Cst changes according to the level difference of the data signal Vdata.

For another example, when the data signal has a different pulse width according to a Pluse Width Modulation (PWM) method, the power level stored in the storage capacitor Cst changes according to the pulse width difference of the data signal Vdata.

The drive switching element SW2 is turned on according to the power level stored in the storage capacitor Cst. When the drive switching element SW2 is turned on, the driving current (IOLED), which is proportional to the stored power level, flows in the organic light emitting layer (OLED). Accordingly, the organic light emitting layer OLED performs a light emitting operation.

The organic light emitting layer OLED may include a light emitting layer (EML) of RGBW corresponding to a subpixel, and may include at least one of a hole injecting layer (HIL), a hole transporting layer (HTL), an electron transporting layer (ETL), and an electron injecting layer (EIL). In addition, it may include a hole blocking layer, and the like.

Meanwhile, all the subpixels emit a white light in the organic light emitting layer OLED. However, in the case of green, red, and blue subpixels, a subpixel is provided with a separate color filter for color implementation. That is, in the case of green, red, and blue subpixels, each of the subpixels further includes green, red, and blue color filters. Meanwhile, since a white subpixel outputs a white light, a separate color filter is not required.

Meanwhile, in the drawing, it is illustrated that a p-type MOSFET is used for a scan switching element SW1 and a drive switching element SW2, but an n-type MOSFET or other switching element such as a JFET, IGBT, SIC, or the like are also available.

Meanwhile, the pixel is a hold-type element that continuously emits light in the organic light emitting layer (OLED), after a scan signal is applied, during a unit display period, specifically, during a unit frame.

Figure 7:
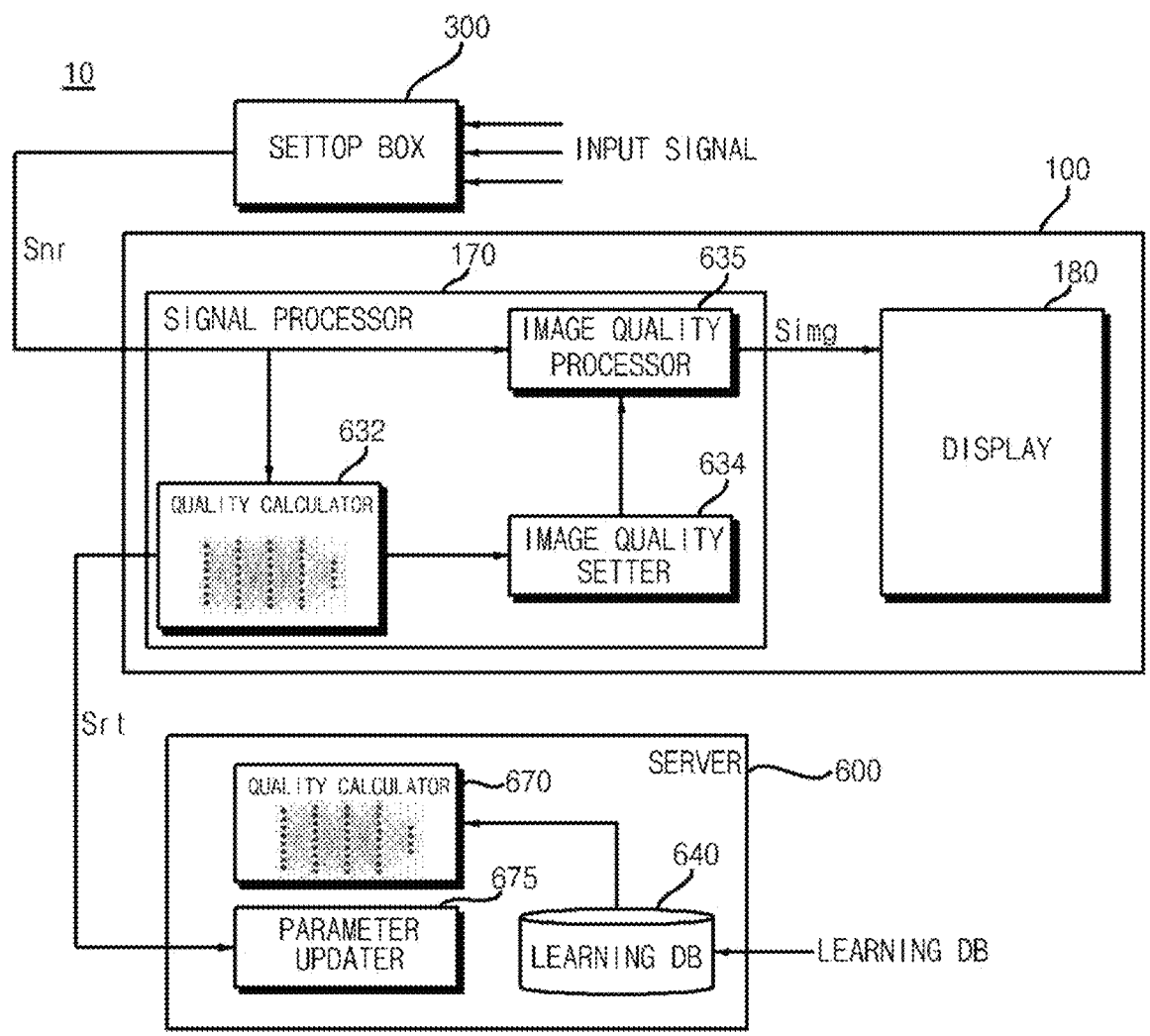
FIG. 7 is an example of an internal block diagram of a signal processing device according to an embodiment of the present disclosure.

FIG. 7 is an example of an internal block diagram of a signal processing device according to an embodiment of the present disclosure, and FIGS. 8 to 16 are diagrams referred to in the description of operations of the signal processing device shown in FIG. 7.

First, referring to FIG. 7, an image display system 10 according to an embodiment of the present disclosure may include an image display apparatus 100, a server 600, and a settop box 300.

The server 600 may include a learning DB 640 configured to receive a training image and store the received training image; a quality calculator 670 configured to calculate an image source quality using the training image from the learning DB 6400 and a Deep Neural Network (DNN); and an parameter updater 675 configured to update a parameter for the DNN based on the learning DB 640 and the quality calculator 670.

The parameter updater 675 may transmit the updated parameter to a quality calculator 632 of the image display apparatus 100.

The settop box 300 may receive an input signal from an image provider, and transmit the image signal to an HDMI terminal of the image display apparatus 100.

The image display 100 may include: an image receiver 105 configured to receive an image signal via an external settop box 300 or a network; a signal processor 170 configured to perform signal processing on the image signal received by the image receiver 105; and a display 180 configured to display an image processed by the signal processor 170.

Meanwhile, the image display apparatus 100 may apply an optimal tuning for the quality of an input image.

Meanwhile, the image display apparatus 100 may analyze an input image in real time to determine a source resolution, a noise level, a compression level, and an enhancement level of the input image.

Meanwhile, the image display apparatus 100 may change an image quality setting based on calculated image information data without causing a sense of discomfort or distortion.

Meanwhile, the signal processor 170 may include: the quality calculator 632 configured to calculate source quality of an image signal received from the external settop box 300 or a network; an image quality setter 634 configured to set the quality of the image signal; and an image quality processor 635 configured to perform image quality processing on the image signal based on the set quality.

If source quality of a received image signal is changed at a first point in time, the image quality setter 634 changes an image quality setting from a first setting to a second setting in a sequence and the image quality processor 635 may perform image quality processing based on the sequential change of the first setting to the second setting. Accordingly, it is possible to reduce flicker when the image quality is changed due to the change of the source quality of the received image signal. In particular, when the source quality of the image signal is changed, the quality may be changed smoothly rather than radically.

Meanwhile, if source quality of a received image signal is modified at a first point in time while an image is reproduced, the image quality setter 634 may sequentially change an image quality setting from a first setting to a second setting. Accordingly, when the source quality of the received image signal is changed, it is possible to change the image quality setting in real time. In particular, when the source quality of the image signal is changed, the image quality may be changed smoothly rather than radically.

Meanwhile, if source quality of a received image signal is changed at a first point in time by a channel change or an input change while the image signal is received from the settop box 300, the image quality setter 634 change the image quality from a first setting to a second setting in a sequence. Accordingly, it is possible to reduce flicker when the image quality is changed due to the source quality of the received image signal is changed. In particular, when the source quality of the image signal is changed, the image quality may be changed smoothly rather than radically.

The quality calculator 632 may classify an input image as an UHD (3840×2160 or more), HD (1280×720), or SD (720×480 or more) image.

The quality calculator 632 may calculate a probability for each resolution with respect to an input image, select a resolution having the highest probability as the final resolution and exclude a resolution having a too low probability.

The quality calculator 632 may anticipate a noise level and a compression level in addition to the resolution.

Meanwhile, when calculating the compression level, the quality calculator 632 may determine the compression level based on training data obtained by reducing a compression bit-rate with reference to an original state or source state.

For example, for FHD, the quality calculator 632 may evaluate the current digital TV broadcasting standard as 1.0 and calculate such that the value can be reduced to 0.0 when data be lost as compressed too much.

Meanwhile, the quality calculator 632 may calculate a noise level by measuring a level of flicker in an input image.

For example, the quality calculator 632 may calculate a level of noise in an input image into one of four levels that are high level, medium level, low level, and no-noise level.

Meanwhile, the quality calculator 632 may calculate a resolution and a noise level of a received image signal using a DNN. Accordingly, it is possible to accurately calculate source quality of the received image.

Meanwhile, the quality calculator 632 may update a parameter for the DNN from the server 600, and calculate a resolution and a noise level of a received image signal based on the updated parameter. Accordingly, it is possible to accurately calculate source quality of an image signal based on learning.

Meanwhile, the quality calculator 632 may extract a first region and a second region from the image signal, and calculate a source resolution of the image signal based on the first region and a noise level of the image signal based on the second region. Accordingly, it is possible to accurately calculate the source quality of the image signal based on extraction of a region suitable for the quality calculation.

Meanwhile, the quality calculator 632 may extract a region having the most edge components in the image signal as a first region, and extract a region having the least edge components in the image signal as a second region. Accordingly, it is possible to accurately calculate the source quality of the image signal based on extraction of a region suitable for the quality calculation.

Meanwhile, the image quality processor 635 may increase the noise reduction processing intensity for an image signal as the calculated noise level increases. Accordingly, it is possible to perform image quality processing appropriate for a noise level of a received image signal.

Meanwhile, the quality calculator 632 may calculate a source resolution, a noise level, and a compression level of a received image signal, and calculate the compression level based on training data obtained by reducing a compression bit rate.

Meanwhile, the image quality processor 635 may decrease the enhancement intensity for the image signal as the higher the calculated compression level increases. Accordingly, it is possible to accurately calculate the compression level.

Meanwhile, the image quality processor 635 may increase the enhancement intensity for the image signal as the source resolution of the image signal increases. Accordingly, it is possible to perform image quality processing appropriate for the source resolution of the received image signal.

Meanwhile, the image quality processor 635 may increase a blurring intensity for the image signal as the calculated compression level increases. Accordingly, it is possible to perform image quality processing appropriate for a compression level of a received image signal.

Meanwhile, the image quality processor 635 may decrease the filter used to filter the image signal as the source resolution of the image signal increases. Accordingly, it is possible to perform image quality processing appropriate for the source resolution of the received image signal.

Meanwhile, the image quality processor 635 may downscale an image signal based on a source resolution of an image signal, perform image quality processing on the downscaled image signal, upscales the image-quality-processed image signal, and output the upscaled image signal. Accordingly, it is possible to perform image quality processing appropriate for the source resolution of the received image signal.

Figure 8:
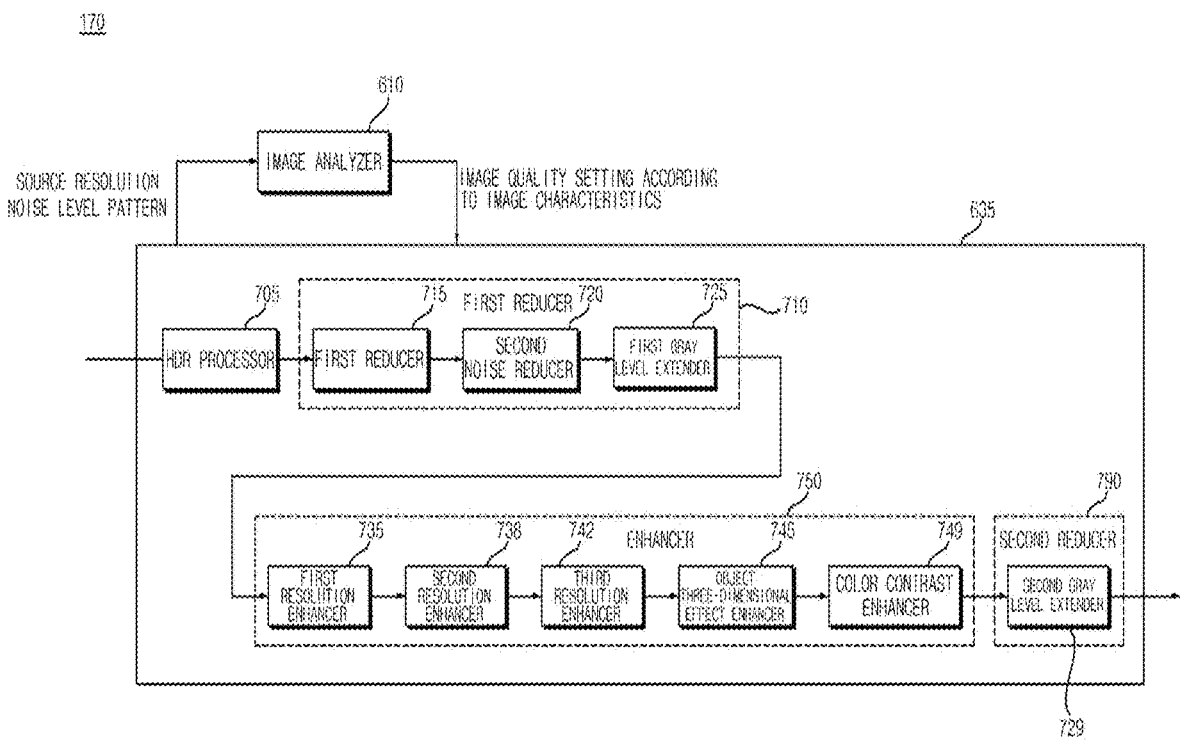
FIGS. 8 to 16 are diagrams referred to in the description of operations of the signal processing device shown in FIG. 7.

FIG. 8 is an example of an internal block diagram of the signal processing device 170 in FIG. 7.

Meanwhile, the signal processing device 170 in FIG. 8 may correspond to the signal processor 170 in FIG. 2.

First, referring to FIG. 8, the signal processing device 170 according to an embodiment of the present disclosure may include an image analyzer 610 and an image quality processor 635.

The image analyzer 610 may include the quality calculator 632 shown in FIG. 7 and an image quality setter 634.

The image analyzer 610 may analyze an input image signal, and output information related to the analyzed input image signal.

Meanwhile, the image analyzer 610 may differentiate an object region and a background region of a first input image signal. Alternatively, the image analyzer 610 may calculate a probability or percentage of the object region and the background region of the first input image signal.

The input image signal may be an input image signal from an image receiver 105 or an image decoded by the image decoder 320 in FIG. 3.

In particular, the image analyzer 610 may analyze an input image signal using artificial intelligence (AI), and output information on the analyzed input image signal.

Specifically, the image analyzer 610 may output a resolution, gray level, a noise level, and a pattern of an input image signal, and output information on the analyzed input image signal, especially image setting information, to the image quality processor 635.

The image quality processor 635 may include an HDR processor 705, a first reducer 710, an enhancer 750, and a second reducer 790.

The HDR processor 705 may receive an image signal and perform high dynamic range (HDR) processing on the input image signal.

For example, the HDR processor 705 may convert a standard dynamic range (SDR) image signal into an HDR image signal.

For another example, the HDR processor 705 may receive an image signal, and perform gray level processing on the input image signal for an HDR.

Meanwhile, if an input image signal is an SDR image signal, the HDR processor 705 may bypass gray level conversion, and, if an input image signal is an HDR image signal, the HDR processor 705 perform gray level conversion. Accordingly, it is possible to improve high gray level expression for an input image.

Meanwhile, the HDR processor 705 may perform gray level conversion processing based on a first gray level conversion mode, in which low gray level is to be enhanced and high gray level is to be saturated, and a second gray level conversion mode, in which low gray level and high gray level are somewhat uniformly converted.

Specifically, if the first gray level conversion mode is implemented, the HDR processor 705 may perform gray level conversion processing based on data corresponding to the first gray level conversion mode in a lookup table.

More specifically, if the first gray level conversion mode is implemented, the HDR processor 705 may perform gray level conversion processing based on an equation for input data and the first gray level conversion mode in a lookup table determined by the equation. Here, the input data may include video data and metadata.

Meanwhile, if the second gray level conversion mode is implemented, the HDR processor 705 may perform gray level conversion processing based on data corresponding to the second gray level conversion mode in a lookup table.

More specifically, if the second gray level conversion mode is implemented, the HDR processor 705 may perform gray level conversion processing based on an equation for input data and data corresponding to the second gray level conversion mode in a lookup table determined by the equation. Here, the input data may include video data and metadata.

Meanwhile, the HDR processor 705 may select the first gray level conversion mode or the second gray level conversion mode according to a third gray level conversion mode or a fourth gray level conversion mode in a high gray level amplifier 851 in the second reducer 790.

For example, if the third gray level conversion mode is implemented, the high gray level amplifier 851 in the second reducer 790 may perform gray level conversion processing based o data corresponding to the third gray level conversion mode in a lookup table.

Specifically, if the third gray level conversion mode is implemented, the high gray level amplifier 851 in the second reducer 790 may perform gray level conversion processing based on an equation for input data and data corresponding to the third gray level conversion mode in a lookup table determined by the equation. Here, the input data may include video data and metadata.

Meanwhile, if the fourth type gray level conversion is implemented, the high gray level amplifier 851 in the second reducer 790 may perform gray level conversion processing based on data corresponding to the fourth gray level conversion mode in a lookup table.

Specifically, if the fourth gray level conversion mode is implemented, the high gray level amplifier 851 in the second reducer 790 may perform gray level conversion processing based on an equation for input data and data corresponding to the fourth gray level conversion mode in a lookup table determined by the equation. Here, the input data may include video data and metadata.

For example, if the fourth gray level conversion mode is implemented in the high gray level amplifier 851 in the second reducer 790, the HDR processor 705 may implement the second gray level conversion mode.

For another example, if the third gray level conversion mode is implemented in the high gray level amplifier 851 in the second reducer 790, the HDR processor 705 may implement the first gray level conversion mode.

Alternatively, the high gray level amplifier 851 in the second reducer 790 may change a gray level conversion mode according to a gray level conversion mode in the HDR processor 705.

For example, if the second gray level conversion mode is implemented in the HDR processor 705, the high gray level amplifier 851 in the second reducer 790 may perform the fourth gray level conversion mode.

For another example, if the first gray level conversion mode is implemented in the HDR processor 705, the high gray level amplifier 851 in the second reducer 790 may implement the third gray level conversion mode.

Meanwhile, the HDR processor 705 according to an embodiment of the present disclosure may implement a gray level conversion mode so that low gray level and high gray level are converted uniformly.

Meanwhile, according to the second gray level conversion mode in the HDR processor 705, the second reducer 790 may implement the fourth gray level conversion mode and thereby amplify an upper limit on gray level of a received input signal. Accordingly, it is possible to improve high gray level expression for the input image.

Next, the first reducer 710 may perform noise reduction on an input image signal or an image signal processed by the HDR processor 705.

Specifically, the first reducer 710 may perform a plurality of stages of noise reduction processing and a first stage of gray level extension processing on an input image signal or an HDR image from the HDR processor 705.

To this end, the first reducer 710 may include a plurality of noise reduction parts 715 and 720 for reducing noise in a plurality of stages, and a first gray level extender 725 for extending gray level.

Next, the enhancer 750 may perform a plurality of stages of image resolution enhancement processing on an image from the first reducer 710.

In addition, the enhancer 750 may perform object three-dimensional effect enhancement processing. In addition, the enhancer 750 may perform color or contrast enhancement processing.

To this end, the enhancer 750 may include: a plurality of resolution enhancers 735, 738, 742 for enhancing a resolution of an image in a plurality of stages; an object three-dimensional effect enhancer 745 for enhancing a three-dimensional effect of an object; and a color contrast enhancer 749 for enhancing color or contrast.

Next, the second reducer 790 may perform a second stage of gray level extension processing based on a noise-reduced image signal received from the first reducer 710. Meanwhile, the second reducer 790 may amplify an upper limit on gray level of a input signal, and extend a resolution of high gray level of the input signal. Accordingly, it is possible to improve high gray level expression for an input image.

For example, gray level extension may be performed uniformly on the entire gray level range of a input signal. Accordingly, gray level extension is performed uniformly on the entire area of an input image, thereby improving high gray level expression.

Meanwhile, the second reducer 790 may perform gray level amplification and extension based on a signal received from the first gray level extender 725. Accordingly, it is possible to improve high gray level expression for an input image.

Meanwhile, if an input image signal input is an SDR image signal, the second reducer 790 may vary the degree of amplification based on a user input signal. Accordingly, it is possible to improve high gray level expression in response to a user setting.

Meanwhile, if an input image signal is an HDR image signal, the second reducer 790 may perform amplification according to a set value. Accordingly, it is possible to improve high gray level expression for an input image.

Meanwhile, if an input image signal is an HDR image signal, the second reducer 790 may vary the degree of amplification based on a user input signal. Accordingly, it is possible to improve high gray level expression according to a user setting.

Meanwhile, in the case of extending gray level based on a user input signal, the second reducer 790 may vary the degree of extension of gray level. Accordingly, it is possible to improve high gray level expression according to a user's setting.

Meanwhile, the second reducer 790 may amplify an upper limit on gray level according to a gray level conversion mode in the HDR processor 705. Accordingly, it is possible to improve high gray level expression for an input image.

The signal processing device 170 includes the HDR processor 705 configured to receive an image signal and adjust luminance of the input image signal, and the reducer 790 configured to amplify brightness of the image signal received from the HDR processor 705 and increase gray level resolution of the image signal to thereby generate an enhanced image signal. The enhanced image signal provides increased luminance and increased gray level resolution of the image signal while a high dynamic range in a displayed HDR image is maintained.

Meanwhile, the range of brightness of the image signal is adjusted by a control signal received by the signal processing device 170.

Meanwhile, the signal processing device 170 further includes an image analyzer configured to determine whether an input image signal is an HDR signal or an SDR signal, and generate a control signal to be provided to the HDR processor 705. The range of brightness of an input image signal is adjusted by a control signal only when the input image signal is an HDR signal.

Meanwhile, the control signal is received from a controller of an image display apparatus, which relates to signal processing, and the control signal corresponds to a setting of the image display apparatus.

Meanwhile, a resolution of gray level is increased based on amplification of adjusted brightness of an image signal.

Meanwhile, a resolution of gray level is increased based on a control signal received by the signal processing device 170.

Meanwhile, a control signal is received from a controller of an image display apparatus, which relates to signal processing, and the control signal corresponds to a setting of the image display apparatus.

Meanwhile, the reducer 790 may include the high gray level amplifier 851 configured to amplify an upper limit on gray level of a input signal, and a decontourer 842 and 844 configured to extend the resolution of gray level amplified by the high gray level amplifier 851.

The second reducer 790 may include a second gray level extender 729 for a second stage of gray level extension.

Meanwhile, the image quality processor 635 in the signal processing device 170 according to the present disclosure is characterized in performing four stages of reduction processing and four stages of image enhancement processing, as shown in FIG. 8.

Here, the four stages of reduction processing may include two stages of noise reduction processing and two stages of gray level extension processing.

Herein, the two stages of noise reduction processing may be performed by the first and second noise reduction parts 715 and 720 in the first reducer 710, and the two stages of gray level extension processing may be performed by the first gray level extender 725 in the first reducer 710 and the second gray level extender 729 in the second reducer 790.

Meanwhile, the four stages of image enhancement processing may include three stages of image resolution enhancement (bit resolution enhancement) and object three-dimensional effect enhancement.

Here, the three stages of image enhancement processing may be performed by the first to third resolution enhancers 735, 738, and 742, and the object three-dimensional effect enhancement may be performed by the object three-dimensional enhancer 745.

Meanwhile, a first feature of the signal processor 170 of the present disclosure is to perform image quality processing in a plurality of stages, in which an image quality may be improved gradually by applying the same algorithm or similar algorithms a plurality of times.

To this end, the image quality processor 635 of the signal processing device 170 of the present disclosure may perform image quality processing by applying the same algorithm or similar algorithms two or more times.

Meanwhile, the same algorithm or the similar algorithms implemented by the image quality processor 635 have a different purpose to achieve in each stage. In addition, since image quality processing is performed gradually in a plurality of stages, there is an advantageous effect to cause a less number of artifacts to appear in an image, resulting in a more natural and more vivid image processing result.

Meanwhile, the same algorithm or the similar algorithms are applied plurality of times alternately with a different image quality algorithm, thereby bringing an effect more than simple continuous processing.

Meanwhile, another feature of the signal processing device 170 of the present disclosure is to perform noise reduction processing in a plurality of stages. Each stage of the noise reduction processing may include temporal processing and spatial processing, which will be described below with reference to FIG. 9A.

Figure 9A:
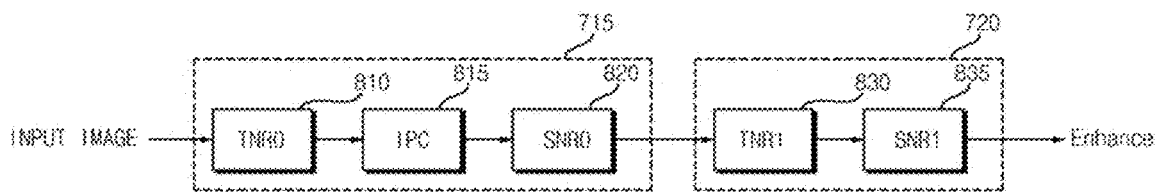

FIG. 9A is a diagram referred to in the description of operations of first and second noise reduction parts 715 and 720 of FIG. 8.

Referring to the drawing, the first and second noise reduction parts 715 and 720 may perform temporal noise processing and spatial noise processing, respectively.

To this end, as a first stage of noise reduction, the first noise reduction part 715 may include a temporal noise reducer 810, an IPC processor 815, and a spatial noise reducer 820.

As a second stage of noise reduction, the second noise reduction part 720 may include a temporal noise reducer 830 and a spatial noise reducer 835.

The temporal noise reducers 810 and 830 may reduce noise by comparing previous data with current data. The spatial noise reducers 820 and 835 may reduce noise by comparing image data included in the current data with surrounding image data.

The data used by the temporal noise reducers 810 and 830 and the spatial noise reducers 820 and 835 may be frame data or field data.

Meanwhile, the first noise reduction part 715 may reduce noise from original data or source data of the input image signal.

The second noise reduction part 720 may reduce flicker between frames of the input image signal, or flicker occurring after noise processing is performed by the first noise reduction part 715.

Meanwhile, the IPC processor 815 may perform interlaced progressive conversion between the temporal noise reducer 810 and the spatial noise reducer 820.

Particularly, if the input image signal is an interlaced image signal, the IPC processor 815 may convert the interlaced image signal into a progressive image signal. The IPC processor 815 will be described below with reference to FIG. 9B.

Figure 9B:
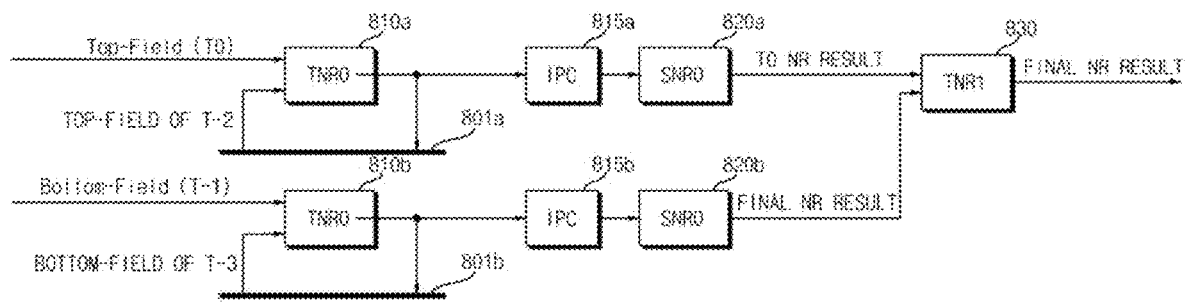

FIG. 9B is a diagram referred to in the description of noise processing in a plurality of stages in the case where an input image is an interlaced image.

Referring to the drawing, processing of a top field of the interlaced image may be performed at a first time point, and processing of a bottom field of the interlaced image may be performed at a second time point.

Specifically, if the input image signal is an interlaced image signal, the temporal noise reducer 810a may perform temporal noise reduction processing at the first time point by using current data To of the top field, and previous data T-2 on which temporal noise processing is performed and which are fed back and stored in the memory 801a.

Further, the IPC processor 815a may perform interlaced progressive conversion by combining the top field image data, on which the temporal noise reduction processing is preformed by the temporal noise reducer 810a, with previous top field image data which are stored in the memory 801a and on which noise reduction processing is performed.

That is, the IPC processor 815a may output frame image data based on the top field image data, on which the temporal noise reduction processing is performed by the temporal noise reducer 810a.

In addition, the spatial noise reducer 820a may perform spatial noise reduction processing on the top field-based frame image data generated and processed by the IPC processor 815a.

Subsequently, if the input image signal is an interlaced image signal, the temporal noise reducer 810b may perform temporal noise reduction processing at a second time point by using current data T-1 of the bottom filed, and previous data T-3 on which temporal noise processing is performed and which are fed back and stored in the memory 801b.

Further, the IPC processor 815b may perform interlaced progressive conversion by combining the bottom field image data, on which the temporal noise reduction processing is performed by the temporal noise reducer 810b, with previous bottom field image data which are stored in the memory 801a and on which noise reduction processing is performed.

That is, the IPC processor 815b may output frame image data based on the bottom field image data, on which the temporal noise reduction processing is performed by the temporal noise reducer 810b.

Further, the spatial noise reducer 820b may perform spatial noise reduction processing on the bottom field-based frame image data generated and processed by the IPC processor 815b.

In addition, the second-stage noise reducer 830 may perform temporal noise reduction processing on the top field-based frame image data, processed by the spatial noise reducer 820a, and the bottom field-based frame image data processed by the spatial noise reducer 820b.

As the second-stage temporal noise reducer 830 performs processing of both the top field-based frame image data and the bottom field-based frame image data together, flicker between the top field and the bottom field may be reduced, which occurs when the top field-based frame image data and the bottom field-based frame image data are not processed together in a previous stage. As a result, artifacts appearing in the interlaced image may be removed.

Meanwhile, it is another feature of the signal processor 170 of the present disclosure to perform gray level reproduction processing or gray level extension processing in a plurality of stages.

The image gray level of the input image signal indicates bit resolution, and represents bit-width of each channel of R, G, and B or Y, Cb, and Cr.

Meanwhile, a number of bits of an image gray level processed by the signal processing device 170 may be 10 bits or more.

Meanwhile, if original data or source data of the input image signal is gray level data of 10 bits or less, the signal processor 170 may perform gray level reproduction processing or gray level extension processing to generate or maintain gray level data of 10 bits or more.

To this end, the image quality processor 635 may perform gray level extension processing in two or more stages, which will be described below with reference to FIG. 9C.

Figure 9C:
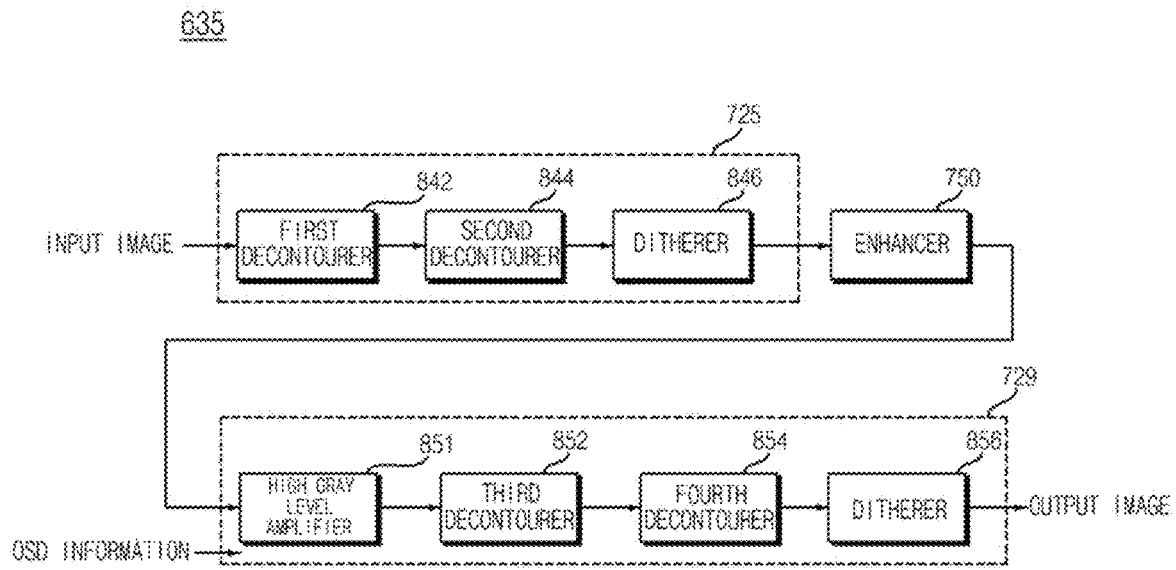

FIG. 9C is a diagram referred to in the description of gray level extension processing.

Referring to FIG. 9C, a first gray level extender 725, an enhancer 750, and a second gray level extender 729 may be used for gray level extension processing.

The first gray level extender 725 may perform first gray level extension processing based on an image signal from the HDR processor 705. That is, the first gray level extender 725 may perform the first gray level extension processing on the gray level converted by the HDR processor 705.

Particularly, for the first gray level extension processing, the first gray scale extender 725 may include decontourers 842 and 844 and a ditherer 846.

Specifically, the first gray level extender 725 may include a first decontourer 842 performing a first stage of decontour processing, a second decontourer 844 performing a second stage of decontour processing, and a ditherer 846.

The second gray level extender 729 may include a high gray level amplifier 851 amplifying a high gray level, a third decontourer 852 performing the first stage of decontour processing, a fourth decontourer 854 performing the second stage of decontour processing, and a ditherer 856 performing dithering.

As the first stage of gray level extension processing, the first decontourer 842 and the third decontourer 852 reproduce a gray level of the input image signal.

As the second stage of gray level extension processing, the second decontourer 842 and the fourth decontourer 852 restore gray level loss caused by internal processing.

Meanwhile, the first gray level extender 725 and the second gray level extender 729 may allow the respective decontourers 842, 844, 852, and 854 to pass through an inner core two or more times, and may gradually increase the gray level by several bits for each corresponding core. For example, the gray level may be reproduced up to 14 bits for each channel.

Meanwhile, the gray level extended by the respective decontourers 842, 844, 852, and 854 may be dithered by the ditherers 846 and 856, such that information loss may be minimized.

Meanwhile, the high gray level amplifier 851 may amplify an upper limit on gray level of an input signal, thereby improving high gray level expression.

Meanwhile, the third and fourth decontourers 852 and 854 may extend resolution of the high gray level amplified by the high gray level amplifier 851.

Meanwhile, the high gray level amplifier 851 may perform boosting of a bright region by amplifying gray level expression of a bright region of the image.

For example, the high gray level amplifier 851 may amplify gray level expression of a region having luminance greater than or equal to a first luminance value, in the image, and may perform boosting of the region having luminance greater than or equal to the first luminance value.

The high gray level amplifier 851 may identify a region of reflected light or a region of light source in the input image signal, and may amplify the identified region to have brightness exceeding a range of values 0 to 1023 for a 10-bit resolution.

As described above, by identifying the region of reflected light or the region of light source in the input image signal and making the identified region brighter to amplify information on a high gray level, an effect similar to the HDR may be provided.

Meanwhile, the second gray level extender 720 may receive OSD information, and may separately perform image quality processing on an OSD region.

In this case, the second gray level extender 729 may not perform high gray level amplification processing on the OSD region.

Meanwhile, the high gray level amplifier 851 may receive an image or OSD information from the enhancer 750.

For example, upon receiving an image from the enhancer 750, the high gray level amplifier 851 may amplify a high gray level of the received image. Particularly, the high gray level amplifier 851 may amplify an upper limit of a maximum gray level.

Meanwhile, upon receiving the OSD information, the high gray level amplifier 851 may not amplify the high gray level of a region corresponding to the OSD information.

Further, if other information (e.g., subtitle information or logo information) is included in the received image, the high gray level amplifier 851 may not amplify the high gray level of a region corresponding to the other information (e.g., subtitle information or logo information).

Accordingly, without amplification of the high gray level, the OSD region or the other information region may be processed by the third decontourer 852 performing the first stage of decontour processing, the fourth decontourer 854 performing the second stage of decontour processing, and the ditherer 856 performing dithering.

FIGS. 10A to 16 are diagrams referred to in the description of operations of the signal processor 170.

Meanwhile, in order to calculate a source quality of an image signal, the present disclosure uses the state-of-the-art technology such as artificial intelligence (AI).

Particularly, the quality calculator 632 may calculate a resolution and a noise level of an input image signal by using a Deep Neural Network (DNN).

The quality calculator 632 or the quality calculator 670 may obtain a source resolution and a training image for each compression rate, and train the network so as to increase accuracy of the calculation.

A variety of images which can be commonly seen in ordinary broadcasting programs are provided as images used for the training, and thus, it is possible to cover any input environment.

Meanwhile, in order to reduce detection time or cost, the quality calculator 632 may perform learning using Convolutional Neural Network, Mobile-Net, and the like which has few number of layers.

For example, the quality calculator 632 may analyze only some regions (e.g., 224×224, 128×128, 64×64, etc.) in an entire image.

Meanwhile, the quality calculator 632 may select a detection region appropriate for a purpose of detection.

For example, the quality calculator 632 may select a first region having the greatest number of edge components when detecting a source resolution, and select a second region having the least number of edge components when detecting noise.

In particular, the quality calculator 632 may apply an algorithm that selects a detection region in a short time in order to increase a processing speed.

For example, the quality calculator 632 may perform pre-processing, such as Fast Fourier Transform (FFT), on a detection region.

FIG. 10 is a diagram showing calculation based on a Convolutional Neural Network (CNN).

Referring to the drawing, a convolutional neural network is used for a particular region 1015 in an acquired image 1010.

As the convolution neural network, a convolution network and a deconvolution network may be implemented.

According to the convolution neural network, convolution and pooling are performed repeatedly.

Figure 10A:
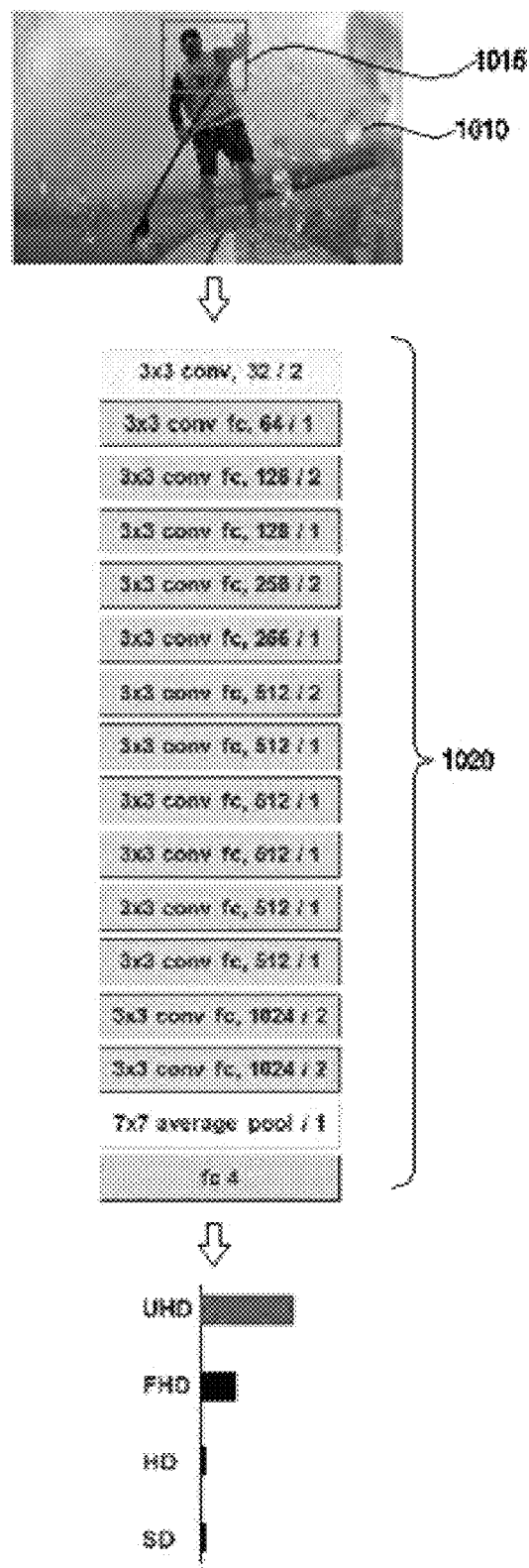

Meanwhile, according to the CNN scheme shown in FIG. 10A, information on a region 1015 may be used to determine types of pixels in the region 1015.

Figure 10B:
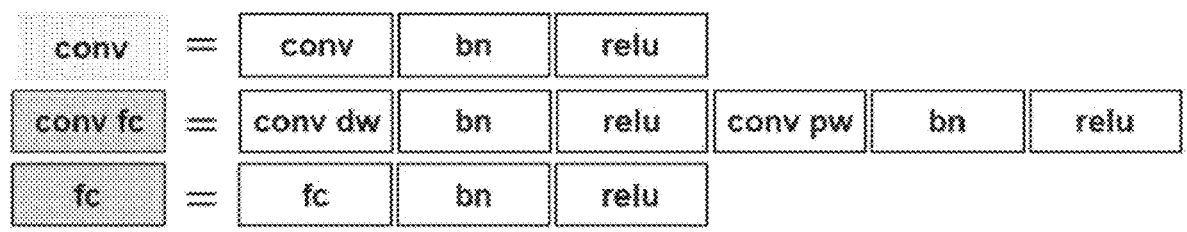

FIG. 10B is a diagram showing calculation based on Mobile-Net.

According to the scheme shown in the drawing, quality calculation is performed.

Meanwhile, the signal processor 170 of the present disclosure may apply, as source quality changes, an image quality setting corresponding to the changed quality in real time.

In particular, in the case of changing an image quality setting, the signal processor 170 may apply the change of the image quality setting without any condition such as a channel change or an input change while an image is reproduced.

In this case, "real time" refers to employing a temporal processing technique including imaging infrared (IIR) and step movement.

Figure 11:
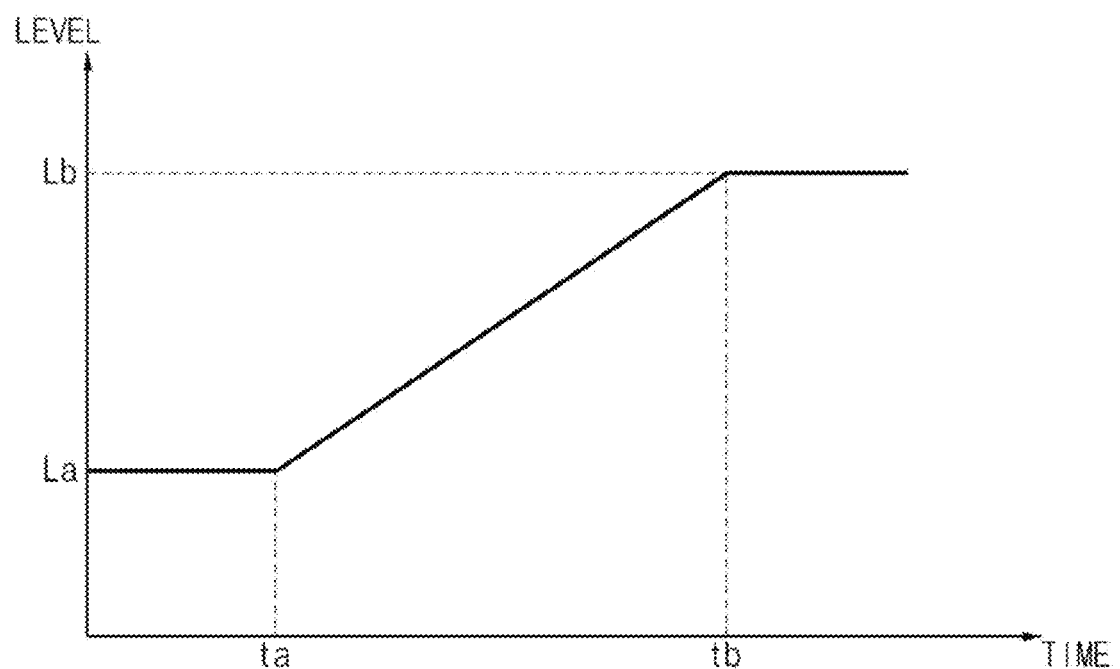

FIG. 11 is a flowchart illustrating an example in which a source quality of the received image signal is changed at a first time point.

Referring to the drawing, if a source quality of the received image signal is changed at a first time point ta, the image quality setter 634 changes an image quality setting sequentially from a first setting La to a second setting Lb. Particularly, the image quality setter 634 may control the second setting Lb to be changed at a second time point tb after the first time point ta. Accordingly, it is possible to reduce flicker when the image quality is changed due to the change of the source quality of the received image signal. Particularly, when the source quality of the image signal is changed, the image quality may be changed smoothly rather than abruptly.

Meanwhile, if a source quality of the received image signal is changed at the first time point during image playback, the image quality setter 634 may change an image quality setting sequentially from the first setting to the second setting. Accordingly, it is possible to change the image quality setting in real time when the source quality of the received image signal is changed. Particularly, when the source quality of the image signal is changed, the image quality may be changed smoothly rather than abruptly.

Meanwhile, the signal processor 170 may increase image definition by adjusting an enhancement intensity of an image quality according to the quality of the input image.

For example, a high-quality image has relatively less picture noise and image cracking. Further, the image may be sharpened with vivid texture and edge, such that a good image quality may be provided.

Meanwhile, the signal processor 170 may perform enhancement processing based on an image quality. In this manner, a good image quality may be achieved by suppressing amplification of bad components and enhancing good components.

Figure 12A:
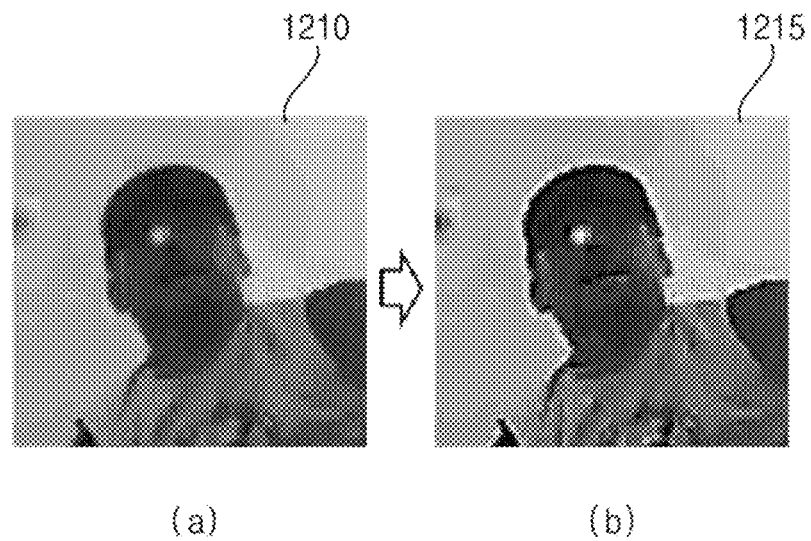

In FIG. 12A, (a) illustrates a low-quality input image, and (b) illustrates an example of amplifying the low-quality image.

Referring to the drawing, it can be seen that when a low-quality image is amplified, the image quality is degraded.

Figure 12B:
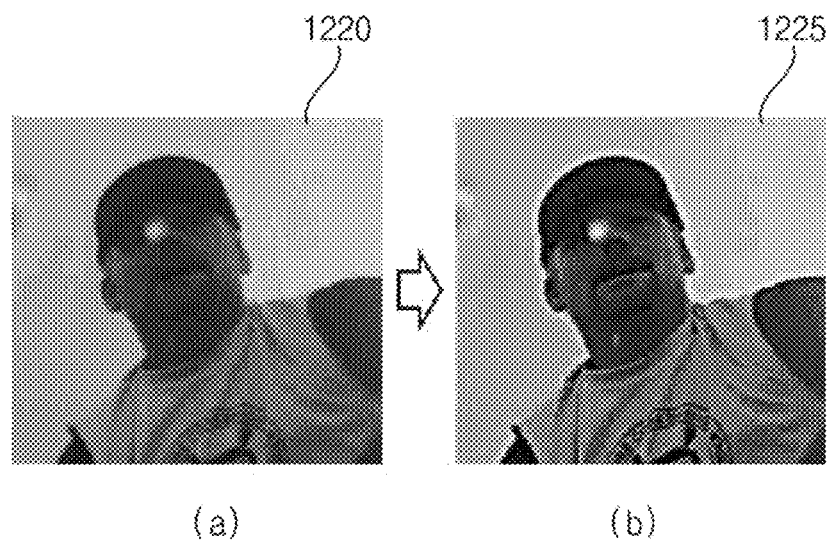

In FIG. 12B (a) illustrates a high-quality input image, and (b) illustrates an example of amplifying the high-quality image.

Referring to the drawing, it can be seen that when a high-quality image is amplified, the image quality increases.

Meanwhile, the signal processor 170 operates to reduce noise in the image by controlling a noise reduction intensity of an image quality according to the quality of the input image. The noise reduction may be performed by the first reduction part 720 of FIG. 8.

The noise reduction has a characteristic in that while reducing noise, the noise reduction processing may cause blur, such as motion blur, smudging, etc., in the image.

Accordingly, it is preferred that the image quality processor 635 may set a low noise reduction intensity for an image having no noise, and may apply a sufficient noise reduction intensity to an image having a high noise level.

Meanwhile, if a sufficient noise reduction intensity is not applied to the image having a high noise level, problems such as flickering, shimmering, and the like may occur.

Figure 13A:

FIG. 13A illustrates an image 1310 having a low noise level, in which case noise reduction processing may not be required.

Figure 13B:

FIG. 13B illustrates an image 1320 having a high noise level, in which case strong noise reduction is required.

Figure 13C:
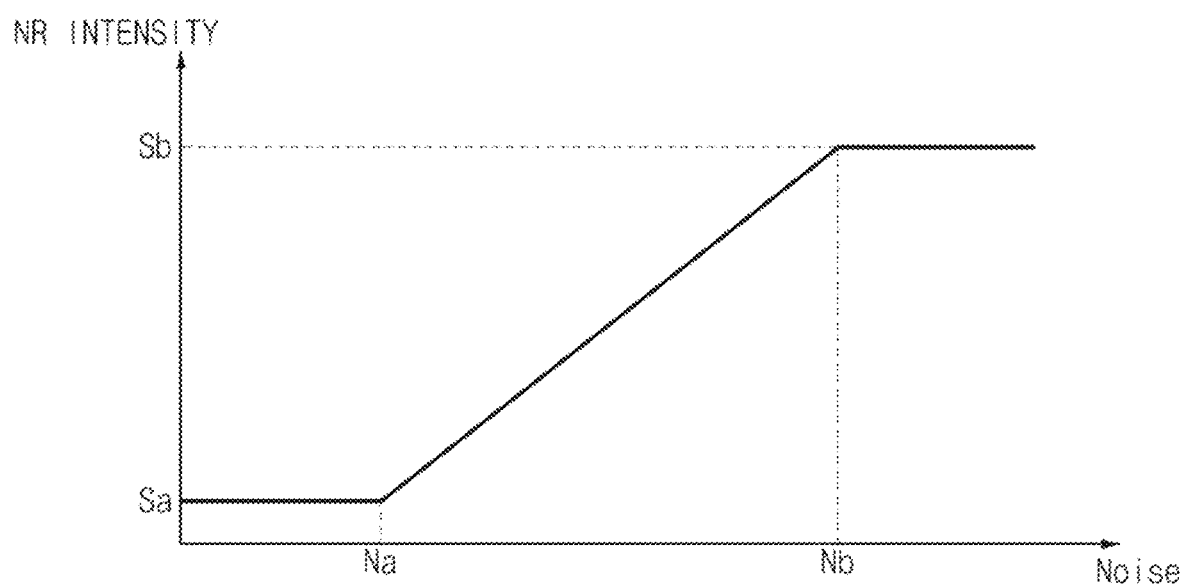

FIG. 13C is a diagram illustrating a correlation between an image noise level and a noise reduction intensity.

Referring to the drawing, a lower limit of the noise reduction intensity may be set to Sa, and an upper limit thereof may be set to Sb, in which if a noise level is Na, the noise reduction intensity may be set to Sa, and if a noise level is Nb, the noise reduction intensity may be set to Sb.

Meanwhile, if a noise level increases from Na to Nb, the noise reduction intensity may increase sequentially from Sa to Sb.

Meanwhile, the signal processor 170 may increase an image quality by controlling enhancement and noise reduction processing for a compressed image according to a measured input image quality.

The level of compression noise changes depending on a compression level of image, and generally increases as a number of times of compression increases. If compression is performed more, image details are lost, and noise such as blocking, mosquito, contour, and the like may occur.

Accordingly, it is preferred that the signal processor 170 reduces an enhancement intensity and applies a stronger blur filter for a highly compressed image.

Meanwhile, a compression level of image determined in units of frames may be applied partially.

Meanwhile, the signal processor 170 may increase a final quality by balancing noise reduction processing with enhancement processing based on a quality measurement result.

The noise reduction processing may be performed by the first reducer 710 of FIG. 8, and the enhancement processing may be performed by the enhancer 750 of FIG. 8.

Figure 14A:
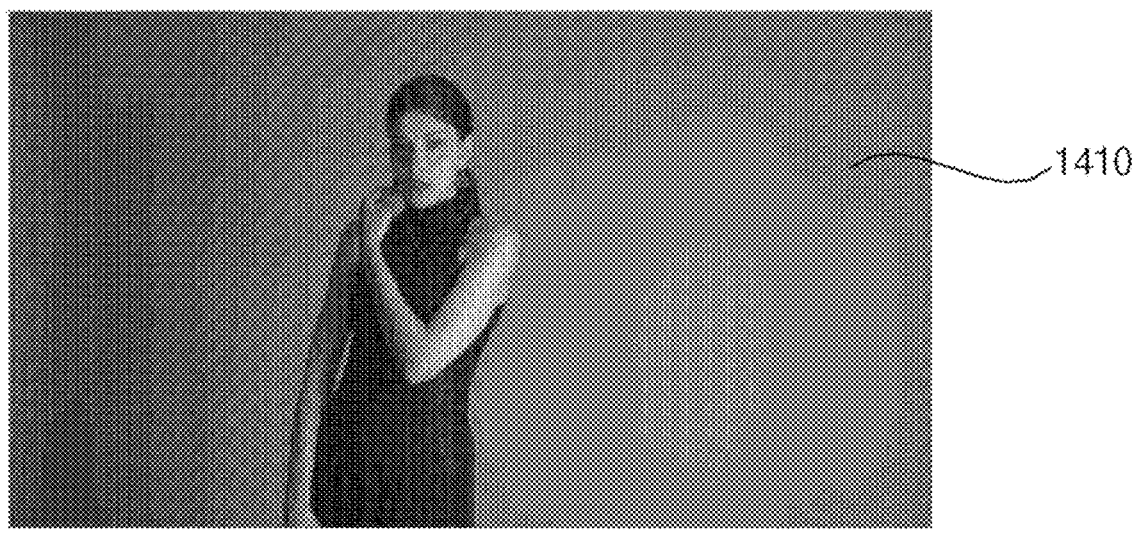

FIG. 14A illustrates a little-compressed image 1410, in which case enhancement processing may be required.

Figure 14B:
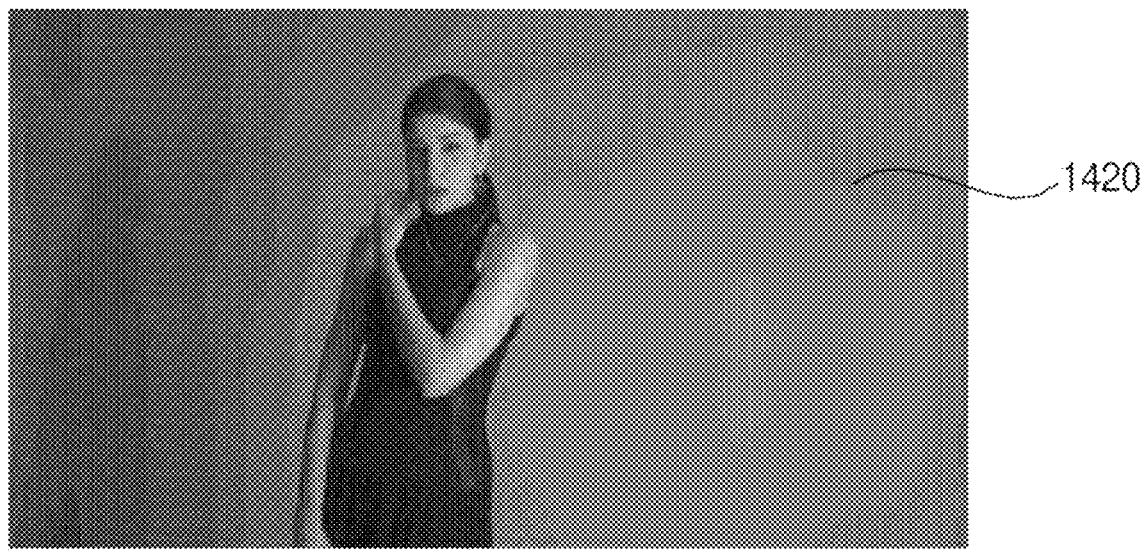

FIG. 14B illustrates a highly-compressed image 1420, in which case blur processing may be required.

Figure 14C:
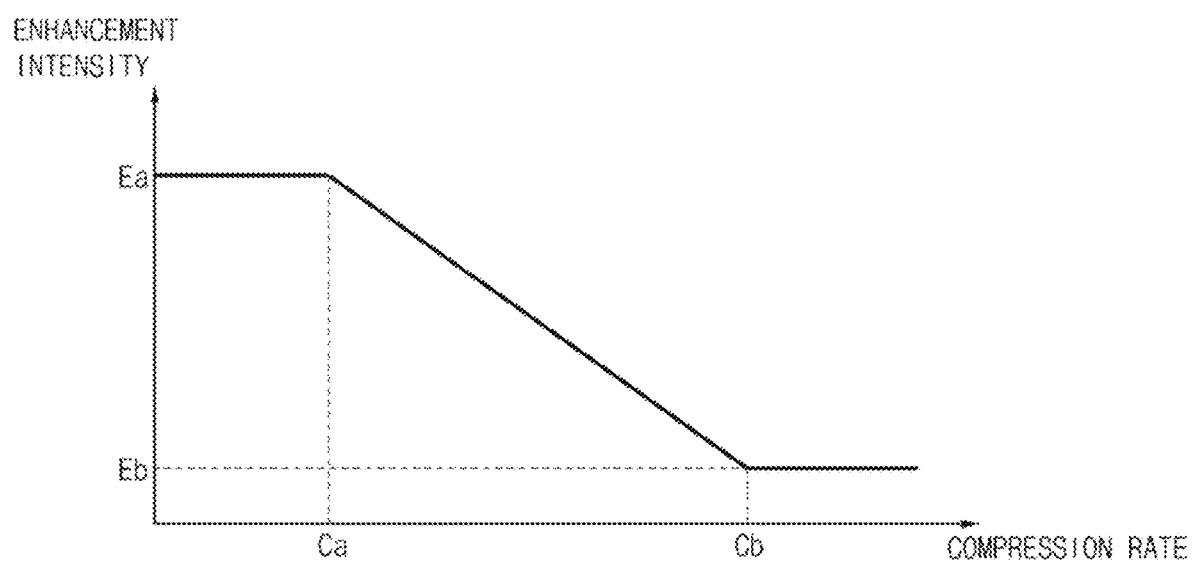

FIG. 14C illustrates a correlation between an image compression level and an enhancement intensity.

Referring to the drawing, a lower limit of the enhancement intensity may be set to Eb, and an upper limit thereof may be set to Ea, in which if a compression rate is Ca, the enhancement intensity may be set to Eb, and if a compression rate is Cb, the enhancement intensity may be set to Ea.

Meanwhile, if the compression rate increases from Ca to Cb, the signal processor 170 may control the enhancement intensity to decrease sequentially from Eb to Ea.

Figure 14D:
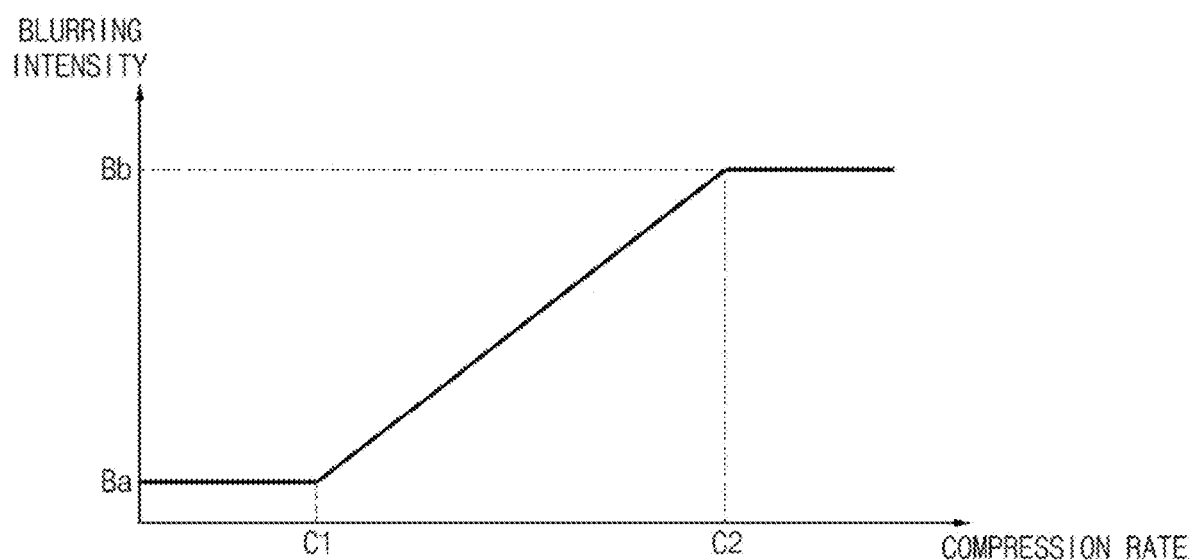

FIG. 14D is a diagram illustrating a correlation between an image compression level and a blurring intensity.

Referring to the drawing, a lower limit of the blurring intensity may be set to Ba, and an upper limit thereof may be set to Bb, in which if a compression rate is C1, the blurring intensity may be set to Ba, and if a compression rate is C2, the blurring intensity may be set to Bb.

Meanwhile, if the compression rate increases from C1 to C2, the signal processor 170 may increase the blurring intensity sequentially from Ba to Bb.

Meanwhile, as a higher-resolution image is input, the signal processor 170 may increase the resolution by reducing the size of a filter.

For example, a low-resolution image has coarse, low frequency texture such that a large filter is required in order to allow such component.

In another example, a high-resolution image has fine, high-frequency texture such that a small filter is required in order to allow such component.

In this manner, by applying a filter having a size corresponding to an image resolution, enhancement and noise reduction effects may be maximized.

Meanwhile, in the present disclosure, an image quality setting changes gradually over time when a source quality is changed.

In this case, when a changing process is performed to apply an image quality setting in real time, a method of performing the changing process slowly is required so that a user may not notice the change.

To this end, in the present disclosure, the image quality setting is changed sequentially based on step movement, imaging infrared (IIR), and the like.

The step movement is a processing method in which a movement amount is determined in small units so that a user may not feel the change, and movement is made by steps determined in consideration of directivity from a current position.

The imaging infrared (IIR) is a method in which a weight of a previous setting is set to a high value and is updated by reflecting a current setting gradually.

Meanwhile, such temporal processing method may include various methods, including all methods of changing an image quality setting to correspond to an image by gradually reflecting the setting in real time.

Figure 15A:
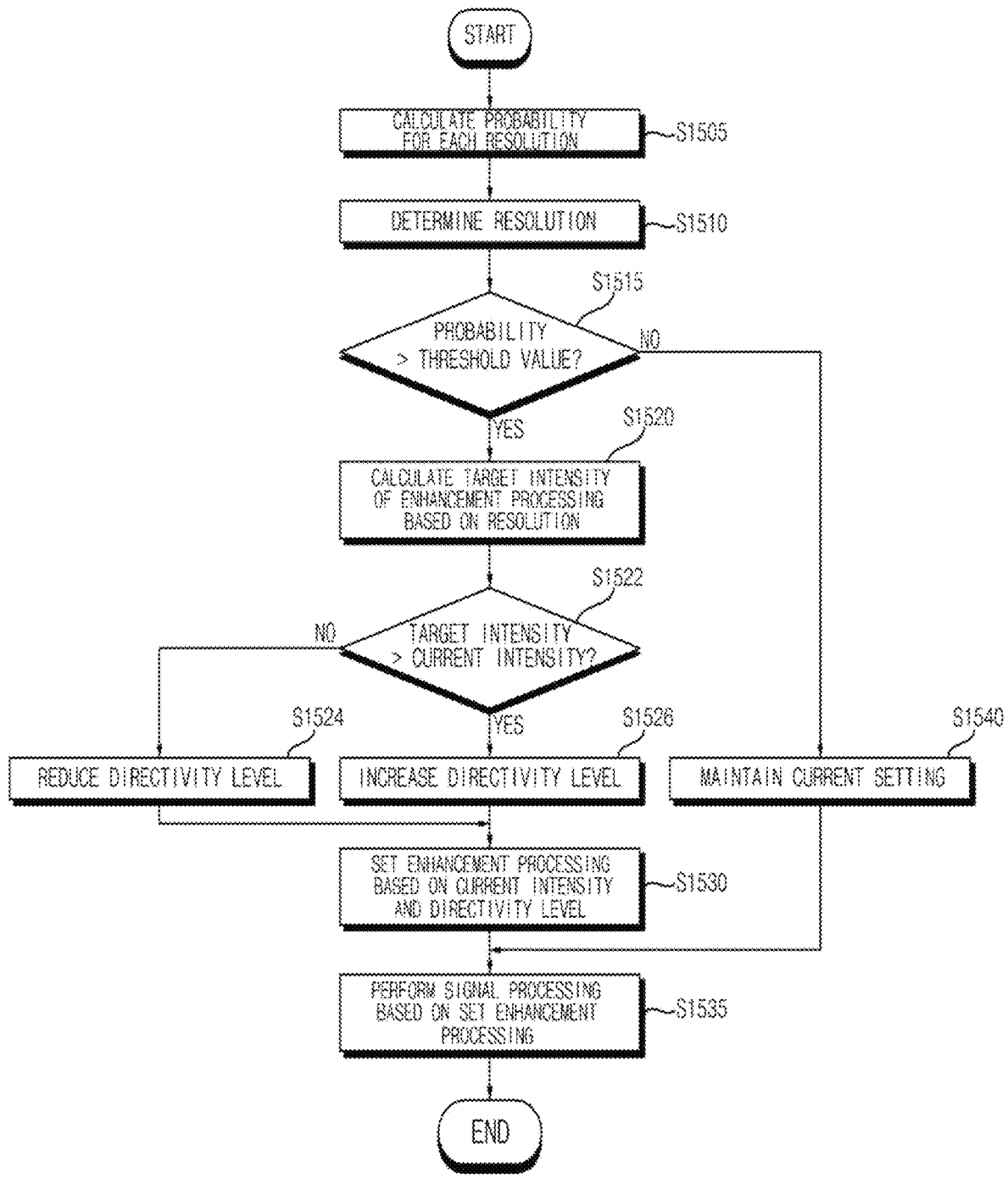

FIG. 15A is a flowchart illustrating an example of gradually performing enhancement processing based on an image resolution.

Referring to the drawing, the quality calculator 632 calculates a probability for each resolution of an input image (S1505), and then determines resolution of the input image (S1510).

Subsequently, the image quality setter 634 or the quality calculator 632 determines whether the probability for each resolution of the input image is greater than or equal to a predetermined value (S515); and if so, the image quality setter 634 may calculate a target intensity of enhancement processing based on the resolution (S1520).

Then, the image quality setter 634 compares the target enhancement intensity with a current intensity (S1522). If the target intensity is lower than or equal to the current intensity, the image quality setter 634 may reduce a directivity level (S1524), and if the target intensity is higher than or equal to the current intensity, the image quality setter 634 may increase a directivity level (S1526).

Next, the image quality setter 634 may set the enhancement processing based on the current intensity and the directivity level (S1530).

Then, the image quality processor 635 may perform enhancement processing based on the enhancement processing set by the image quality setter 634 (S1535).

Meanwhile, if a probability in operation S1515 is lower than or equal to a predetermined value, the current setting is maintained as it is (S1540).

Accordingly, it is possible to perform the enhancement processing gradually according to an image resolution.

Figure 15B:
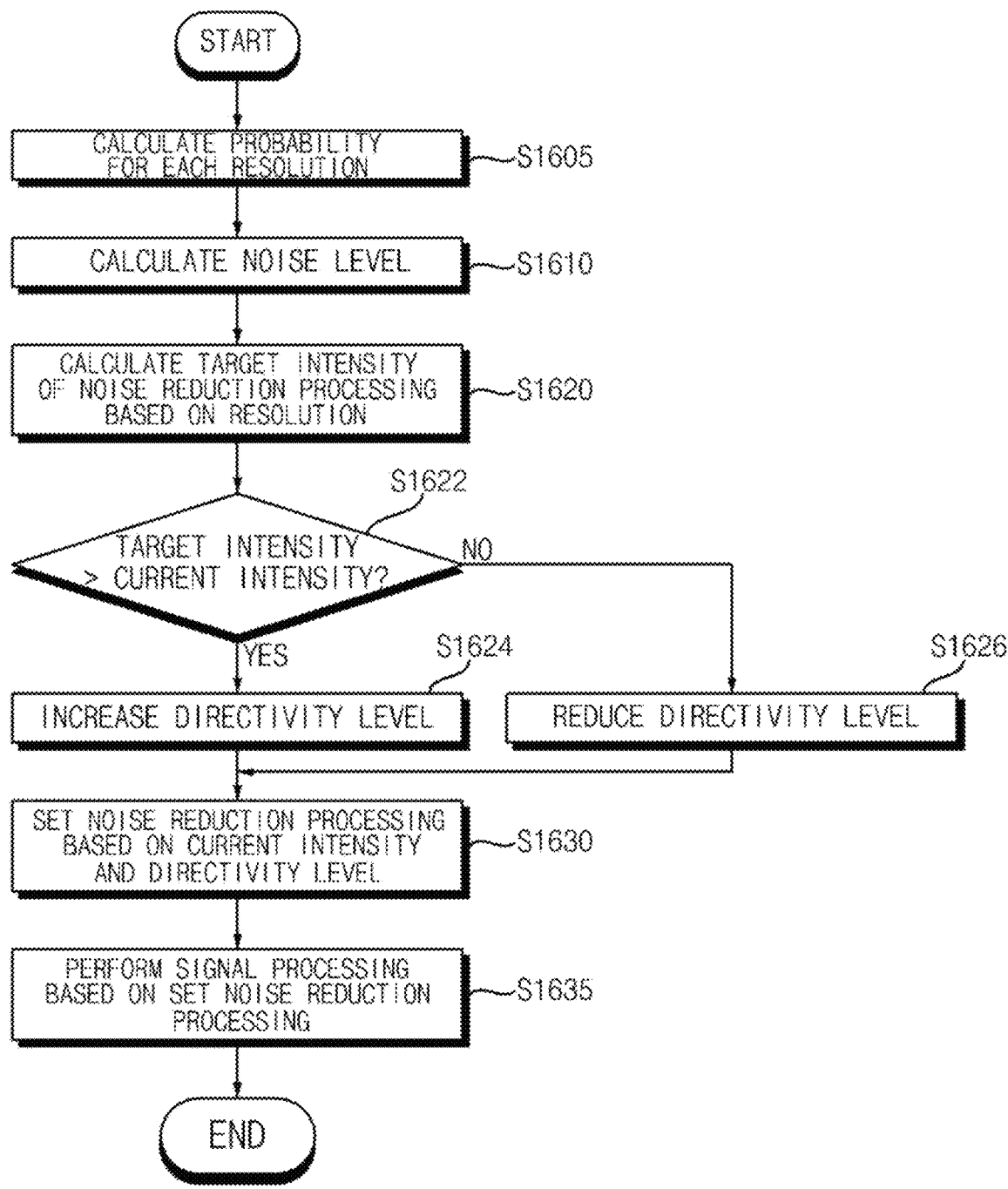

FIG. 15B is a flowchart illustrating an example of gradually performing noise reduction processing based on resolution.

Referring to the drawing, the quality calculator 632 calculates a probability for each resolution of an input image (S1605), and then determines resolution of the input image.

The quality calculator 632 calculate a noise level of the input image (S1610).

Then, the image quality setter 634 calculates a target intensity of noise reduction processing based on the resolution (S1620).

Subsequently, the image quality setter 634 compares the target intensity of noise reduction processing with a current intensity (S1622). If the target intensity is higher than the current intensity, the image quality setter 634 increases a directivity level (S1624), and if the target intensity is lower than or equal to the current intensity, the image quality setter 634 decreases a directivity level (S1626).

Next, the image quality setter 634 sets noise reduction processing based on the current intensity and the directivity level (S1630).

Then, the image quality processor 635 performs noise reduction processing based on the noise reduction processing set by the image quality setter 634.

Accordingly, it is possible to perform the noise reduction processing gradually according to an image resolution.

Then, the image display apparatus 100 according to an embodiment of the present disclosure may display an image evaluation result and a process of applying the image quality setting on a screen.

That is, the image display apparatus 100 may display on the display 180 that an image evaluation function is performed well. Particularly, by using the OSD on the screen, the image display apparatus 100 may display the information on a portion of the image.

Figure 16:
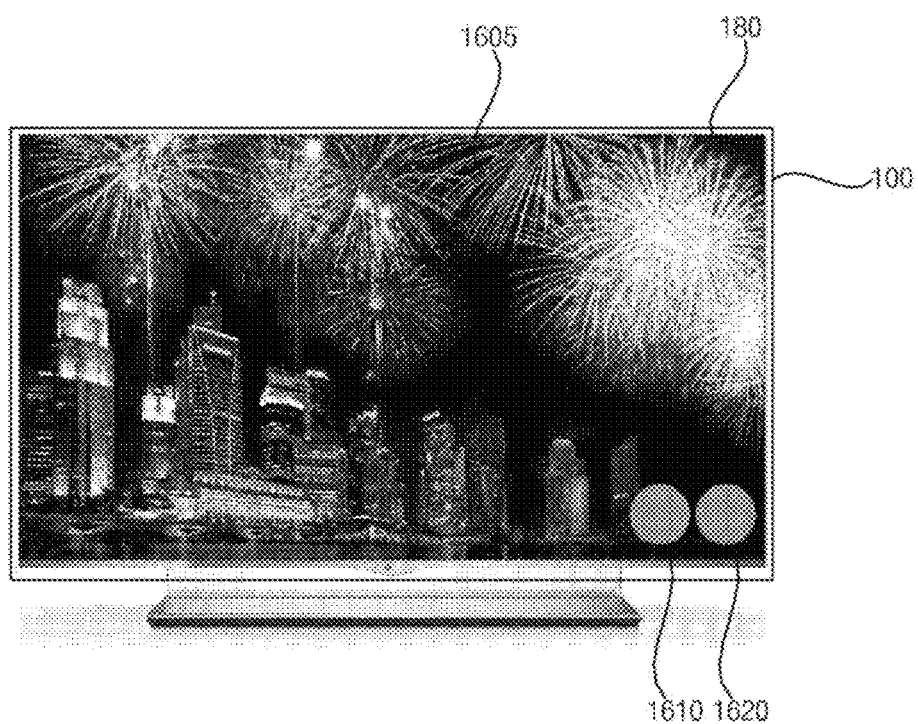

FIG. 16 is a diagram illustrating a first object 1610 indicating a source quality, and a second object 1620 indicating an image quality set based on the source quality.

Referring to the drawing, the display 180 of the image display apparatus 100 may display an image 1605, which is signal-processed by the signal processor 170 of FIG. 7 and the like.

In this case, the display 180 may display, along with the image 1605, the first object 1610 indicating a calculated source quality of the received image signal, and the second object 1620 indicating the image quality set based on the source quality. Accordingly, a user may easily identify the source quality and the set image quality.

Meanwhile, if the source quality of the received image signal is changed, the display 180 may display the first object 1610 and the second object 1620 for a predetermined period of time. Accordingly, when the source quality is changed, a user may easily identify the source quality and the set image quality.

While the present disclosure has been particularly shown and described with reference to exemplary embodiments thereof, it is clearly understood that the same is by way of illustration and example only and is not to be taken in conjunction with the present disclosure. It will be understood by those skilled in the art that various changes in form and details may be made therein without departing from the subject matter and scope of the present disclosure.

What is claimed is:

1. A signal processing device comprising:
    a quality calculator configured to calculate a source quality of an image signal received from an external settop box or a network and transmit the calculated source quality of the image signal,
wherein the calculated source quality of the image signal includes a calculated resolution and a calculated compression level of the image signal;
an image quality setter configured to set an image quality of the image signal based on the calculated source quality; and
an image quality processor configured to
increase an enhancement intensity of the image signal, based on the calculated compression level decreasing or based on the calculated resolution of the image signal increasing.

2. The signal processing device of claim 1, wherein the image quality setter is further configured to:
change, during image playback, the set image quality from a first image quality setting to a second image quality setting, in response to the source quality of the received image signal being changed at a first time point.

3. The signal processing device of claim 1, wherein the image quality setter is further configured to:
change, while the image signal is received from the settop box, the set image quality from a first image quality setting to a second image quality setting in response to the source quality of the received image signal being changed at a first time point by a channel change or an input change.

4. The signal processing device of claim 1, wherein the quality calculator is further configured to calculate a noise level of the received image signal.

5. The signal processing device of claim 4, wherein the quality calculator is further configured to:
extract a first region and a second region from the image signal;
calculate the resolution of the image signal based on the first region; and
calculate the noise level of the image signal based on the second region.

6. The signal processing device of claim 5, wherein the quality calculator is further configured to:
extract a region, having most edge components in the image signal, as the first region; and
extract a region having fewest edge components in the image signal, as the second region.

7. The signal processing device of claim 4, wherein the quality calculator is further configured to increase a noise reduction intensity of the image signal as the calculated noise level increases.

8. The signal processing device of claim 1, wherein the quality calculator is further configured to calculate the resolution and a noise level of the received image signal using a Deep Neural Network (DNN).

9. The signal processing device of claim 1, wherein the quality calculator is further configured to:
update a parameter for a Deep Neural Network (DNN) received from a server; and
calculate the resolution and the compression level of the received image signal based on the updated parameter.

10. The signal processing device of claim 1, wherein the quality calculator is further configured to:
calculate the compression level based on training data obtained by reducing a compression bit rate.

11. The signal processing device of claim 1, the image quality processor is further configured to:
decrease an enhancement intensity of the image signal as the calculated compression level increases.

12. The signal processing device of claim 1, the image quality processor is further configured to:
decrease an enhancement intensity of the image signal as the resolution of the image signal decreases.

13. The signal processing device of claim 1, the image quality processor is further configured to:
increase a blurring intensity of the image signal as the calculated compression level increases.

14. The signal processing device of claim 1, the image quality processor is further configured to:
decrease a size of a filter for filtering the image signal as the resolution of the image signal increases.

15. The signal processing device of claim 1, wherein the image quality processor is further configured to:
downscale the image signal based on the resolution of the image signal;
perform image quality processing on the downscaled image signal;
upscale the image signal on which the image quality processing is performed; and
outputs the upscaled image signal.

16. An image display apparatus comprising:
an image receiver configured to receive an image signal from an external settop box or a network;
a display: and
a processor configured to:
receive the image signal from the image receiver; and
calculate a source quality of the image signal and transmit the calculated source quality of the image signal, wherein the calculated source quality of the image signal includes a calculated
resolution and a calculated compression level of the received image signal;
set an image quality of the image signal based on the calculated source quality;
increase an enhancement intensity of the image signal, based on the calculated compression level decreasing or based on the calculated resolution of the image signal increasing; and
cause the display to display an image based on the image signal.

17. The image display apparatus of claim 16, wherein the processor is further configured to:
cause the display to display:
a first object indicating the calculated source quality of the received image signal; and
a second object indicating the set image quality.

18. The image display apparatus of claim 17, wherein the processor is further configured to:
cause the display to display the first object and the second object for a defined period of time, in response to the source quality of the received image signal being changed.

19. The image display apparatus of claim 16, wherein the processor is further configured to:
change, while the image signal is received from the settop box, the set image quality from a first image quality setting to a second image quality setting in response to the source quality of the received image signal being changed at a first time point by a channel change or an input change.

20. The image display apparatus of claim 16, wherein the processor is further configured to:
calculate a noise level of the received image signal using a Deep Neural Network (DNN).

* * * * *